United States Patent
St. Martin et al.

(10) Patent No.: US 12,554,686 B2
(45) Date of Patent: Feb. 17, 2026

(54) SOCIAL IDENTITY OF OBJECTS

(71) Applicant: INVISIBLE HOLDINGS, LLC, Reno, NV (US)

(72) Inventors: Raymond Francis St. Martin, Felton, CA (US); Andrew Lee Van Valer, Reno, NV (US)

(73) Assignee: INVISIBLE HOLDINGS, LLC, Reno, NV (US)

( * ) Notice: Subject to any disclaimer, the term of this patent is extended or adjusted under 35 U.S.C. 154(b) by 0 days.

(21) Appl. No.: 18/924,128

(22) Filed: Oct. 23, 2024

(65) Prior Publication Data
US 2025/0045254 A1    Feb. 6, 2025

Related U.S. Application Data

(63) Continuation-in-part of application No. 17/961,074, filed on Oct. 6, 2022, now Pat. No. 12,147,456, which is a continuation-in-part of application No. 16/787,385, filed on Feb. 11, 2020, now Pat. No. 11,809,383, which is a continuation-in-part of application No. 15/080,028, filed on Mar. 24, 2016, now Pat. No. 10,594,831.

(60) Provisional application No. 62/138,666, filed on Mar. 26, 2015.

(51) Int. Cl.
*G06F 16/21* (2019.01)
*G06F 16/242* (2019.01)
*G10L 15/22* (2006.01)

(52) U.S. Cl.
CPC ............ *G06F 16/21* (2019.01); *G06F 16/243* (2019.01); *G10L 15/22* (2013.01)

(58) Field of Classification Search
CPC .......... H04W 4/70; H04W 4/02; G06Q 50/01; G06Q 10/101; G06Q 30/018; G06F 21/44; G06F 21/36; G06F 16/21; G06F 16/243; G06F 3/167; G10L 15/22; G10L 15/00
See application file for complete search history.

(56) References Cited

U.S. PATENT DOCUMENTS 8,994,645 B1 * 3/2015 Meehan .................. H04L 12/16
  345/156
9,779,731 B1 * 10/2017 Haskin .................... G10L 15/20
(Continued)

*Primary Examiner* — Etienne P Leroux
(74) *Attorney, Agent, or Firm* — Donald R. Boys; Central Coast Patent Agengy LLC

(57) ABSTRACT

A system has a server having an internal data repository, an internal database storing data describing virtual objects, each having a unique SIO code, and an associated body of digital media providing object description by one or more of audio files, text files, photographs, and videos, object history and stories about the virtual objects, a user station with Internet access, a microphone, a display screen, a speaker system, and a coupled local data repository, and a software-enabled interface between the user station and the internal data repository. The user selects an SIO search, the system in response initiates a reactive natural language session with the user through the software-enabled interface, the user speaks queries and commands into the microphone, and the system interprets the queries and commands and endeavors to perform the commands and answer the queries by audio through the speaker system and display on the display screen.

10 Claims, 20 Drawing Sheets

(56) References Cited

U.S. PATENT DOCUMENTS

| | | | | |
|---|---|---|---|---|
| 2003/0108046 A1* | 6/2003 | Simeone | ............... | H04Q 11/04 |
| | | | | 370/466 |
| 2005/0197118 A1* | 9/2005 | Mitchell | ............... | H04W 48/14 |
| | | | | 455/434 |
| 2010/0004944 A1* | 1/2010 | Palaniappan | .......... | G06Q 10/10 |
| | | | | 707/E17.108 |
| 2014/0196091 A1* | 7/2014 | Shin | ........................ | G10L 15/26 |
| | | | | 725/53 |
| 2015/0100509 A1* | 4/2015 | Pappas | .................. | G06Q 30/02 |
| | | | | 707/723 |
| 2016/0070762 A1* | 3/2016 | Nicholls | ............. | G06F 16/3329 |
| | | | | 707/722 |

* cited by examiner

SOCIAL IDENTITY OF OBJECTS

CROSS-REFERENCE TO RELATED APPLICATIONS

The present application is a Continuation-in-Part (CIP) application of and claims priority to U.S. application Ser. No. 17/961,074, filed Jun. 10, 2022, which is a CIP of U.S. application Ser. No. 16/787,385 filed 11-2-2020, which is a CIP of U.S. application Ser. No. 15/080,028 filed 24 Mar. 2016, now issued as U.S. Pat. No. 10,594,831 on 17 Mar. 2020, which claims priority to provisional application 62/138,666 filed 26 Mar. 2015. All disclosure of the prior applications is incorporated herein at least by reference.

BACKGROUND OF THE INVENTION

1. Field of the Invention

The present invention is in the technical area of information management and pertains more specifically to apparatus and methods for creating a social identity for an object or a collection of objects and associating that object in a comprehensive information system with specific persons and descriptive and contextual information.

2. Description of Related Art

Two U.S. Pat. Nos. 10,594,831 and 11,809,383 have issued from applications in the Cross-Reference above, and two other applications listed in the Cross-Reference have received a Notice of Allowance. The time of filing the instant application. Each of the applications in the continuing series of continuation-in-part applications describes and claims new matter over the original U.S. Pat. No. 10,594,831 and over an application just preceding by date.

The instant application describes and claims procedures for finding and displaying rich contextual information regarding individual ones of objects instantiated as virtual objects in the overall collection of objects in the SIO collection. The inventors term this enhancement SIO 360, as it provides a 360 degree view of an individual object, comprising that object's origin, it's evolution as an SIO object, relationships with other SIO objects and persons, and a comprehensive view of information related to the object.

To accomplish the stated purpose of SIO 360 there must be available to a registered member a wide variety of ways to seek, find, and organize ways of presenting information regarding an object, and a user engaged in this process must have an ability to select and navigate among this wide variety of ways to seek, find, and organize system for presenting information found. Illustrations beginning with FIG. 19 and description beginning with description of FIG. 19 are the processes of SIO 360.

BRIEF SUMMARY OF THE INVENTION

In an embodiment of the invention a system is provided comprising an Internet-connected server having a coupled internal data repository, the server executing software by a processor from a non-transitory physical medium, an internal database enabled by the software, storing data describing virtual objects in a structured manner, each virtual object having a unique SIO code, and an associated body of digital media providing object description by one or more of audio files, text files, photographs, and videos, object history including owners and stories about the virtual objects, a user station with Internet access, a microphone receiving user voice, a display screen, a speaker system, and a coupled local data repository, and a software-enabled interface between the user station and the internal data repository. The system presents an input option to a user at the user station affording the user a selection of an SIO Search, the user selects SIO search, the system in response initiates a reactive natural language session with the user through the software-enabled interface, the user speaks queries and commands into the microphone, and the system interprets the queries and commands and endeavors to perform the commands and answer the queries by audio through the speaker system and display on the display screen.

In one embodiment the user, after the system initiates the natural language session, states by voice a name or a code of a virtual object stored in the internal data repository, and the system in response displays a name, the SIO code and a description of the virtual object on the display screen. Also, in one embodiment virtual objects described in the internal data repository mirror real objects in the real world and encompass at least physical objects, imaginary objects, poetry, musical works, works of art like paintings, complex objects comprising assemblies of smaller objects, buildings, arenas, sports teams, sport paraphernalia, and anything described by a noun. In one embodiment structured associations are recorded in the internal data repository between individual ones of virtual objects and between objects and persons. And in one embodiment the user queries associations and the system in response reports the associations between virtual objects in one or both of the display and the speaker system.

In one embodiment, in response to a user command the system recites a specific poem. Also, in one embodiment the system has the specific poem recorded by a plurality of persons and affords the user a choice of reciters. Also, in one embodiment, in response to a user command, the system delivers a specific musical presentation. In one embodiment the system has the musical presentation recorded by a plurality of musicians and musical groups and affords the user a choice of musicians and groups to deliver the musical presentation.

In one embodiment the display is a large screen, high resolution display, the speaker system is a high-end system and the Internet connection is high-bandwidth. And in one embodiment, in response to user queries, the system responds with history, composition, beginning stories and other information about any virtual object.

BRIEF DESCRIPTION OF THE DRAWING FIGURES

DETAILED DESCRIPTION OF THE INVENTION

Figure 1:
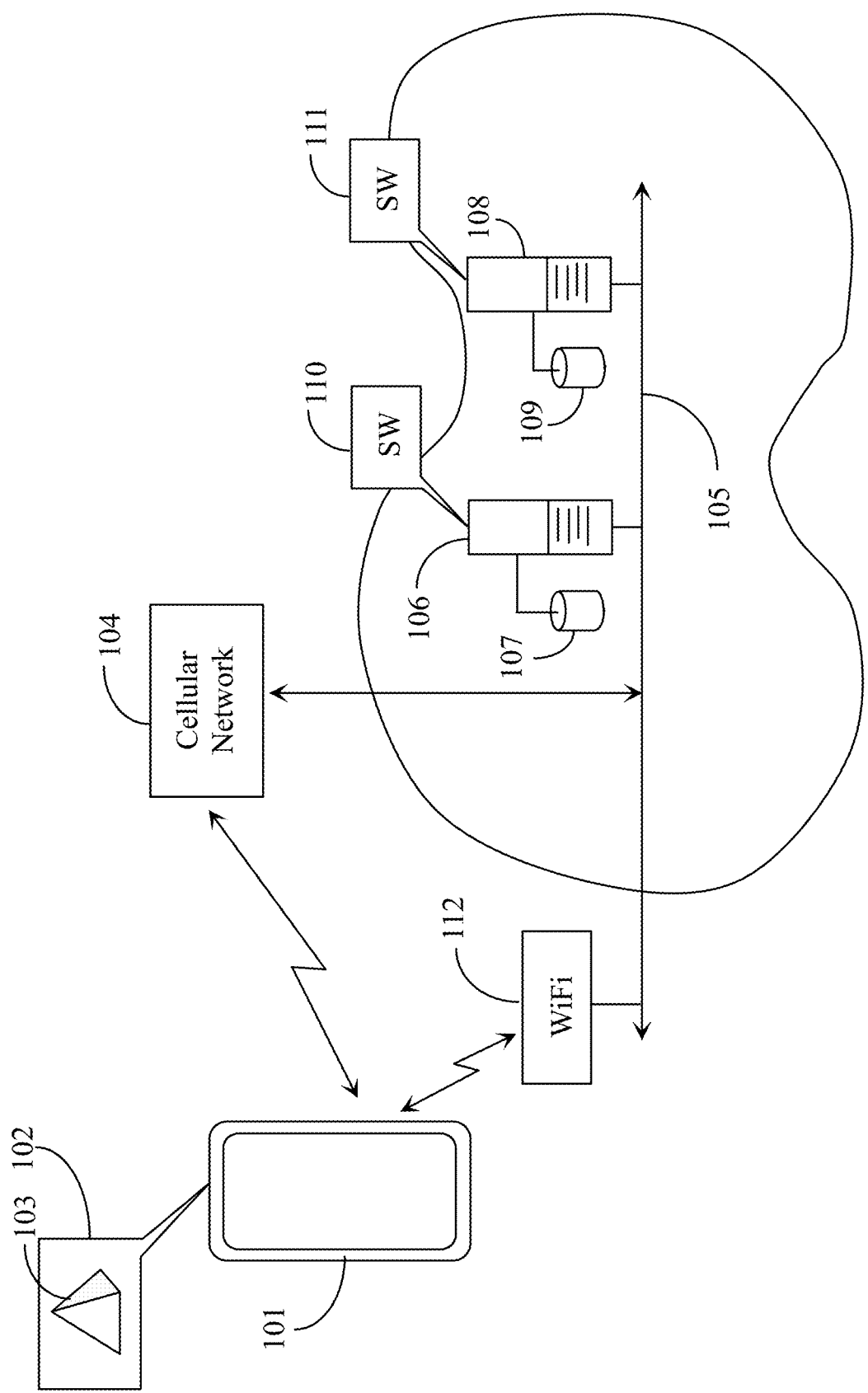
FIG. 1 is a simple architectural diagram illustrating one embodiment of the invention.

In an embodiment of the invention an object embodying some level of intrigue or importance to one or more persons is registered (instantiated) with a service of the invention, the object receiving a unique code printable or otherwise displayable on the object or on a sticker or identifier placed on, in or otherwise associated with the object being registered. As will become clear in further description below, some objects may be so very well-known that there would be no need to physically associate the object with a physical indicia of the unique code associated with the object. For example, the city of Washington, D.C. is so well-known that it would never be confused with another city, so, if the City of Washington D.C. were to be instantiated as an object in an embodiment of the invention, the city would be assigned a unique code, but it would not be necessary (nor indeed possible) to affix a sticker or other physical indicia to the city.

The code in embodiments of this invention is henceforth termed an SIO code. The SIO code may be machine-readable and may in some embodiments be captured using an imaging mechanism of a mobile telephone for example. In one embodiment the code may be used to retrieve information about the object over the Internet network, including associations with persons, with other objects, with stories, with time windows, and with a broad variety of other criteria. The code may be embodied to be transferrable in a bar code or a QR code.

In one embodiment of the invention it is important that the code be unique to the particular object with which it associated and given the potential number of objects that might be identified in this way, the code needs to be of a nature that a very large number of different unique codes may be generated.

One way such codes may be generated and used is simply by a binary string of sufficient length. An example is the 128-bit nature of IPV6 code now used for Internet IP addresses. A 128-bit binary sequence provides 2128 unique designations. This is 340,282,366,920,938,000,000,000, 000,000,000,000,000 designations. This is $2^{52}$ addresses for every observable star in the known universe, or $2^{95}$ addresses for each of the about 6.5 billion persons alive today. This is enough to assign a unique address to every atom on the surface of the Earth, with enough left over to do every atom on another 100+ planets. This should be enough.

It is not, of course, necessary that a 128-bit binary number be readable somehow from an object tagged with one such number. The bit sequence may, of course, be rendered by use of hexadecimal notation, as it is in IPV6, or in any of several other ways to be a much shorter and less complicated rendition, perhaps by scientific notation, for example, which may, upon entry of capture, be translated in any other convenient way. There are many shorthand ways of expressing large numbers, and any and all may be useful in embodiments of the invention. It is important that the code be unique and that it be associated with a single object or entity, and that it be embodied in a way that is easy to capture and/or enter into an Internet-capable device.

At this point it is important to understand that an object associated with a code in an embodiment of the invention need not be an atomic object, as in the case of the city of Washington, D.C. mentioned above. The coded object may be composed of many other objects, which may each bear or be uniquely associated with (or not) an SIO code. As a simple example, consider the Empire State Building in New York City. For that matter, consider New York City as an example, and the Empire State Building as a lower hierarchical component of New York City. One or both may be assigned an SIO code. Further, many other buildings (and streetlamps) in New York City may be tagged with an SIO code. Different floors of the Empire State Building may be uniquely tagged as well, and thousands of other objects in the Empire State Building may be uniquely tagged.

In this grand scheme of things, the skilled person will see that the SIO codes may be nested in a hierarchical scheme such that codes recorded in memory in a system of the invention may be associated hierarchically in a parallel manner to the manner that the real objects are associated in the real world. And it should be noted that the word "objects" in this sense is used in a broad context, so buildings and battleships, for example, may be objects with an SIO code, and components of the buildings and battleships may have separate unique SIO codes. It is intended in one embodiment that any object entity that has mass may be a candidate for an SIO code. In some embodiments of the invention provision is made for SIO codes assigned to virtual entities, that is, to ideas that have no mass, but are instantiable in the minds of persons who may avail themselves of services of the invention.

An example of a virtual entity might be the Angel Gabriel. The idea of the angel is not known in the annals of science to be a specific object having mass and occupying space, but is most certainly an entity that may be invested with characteristics and qualities in the minds of human beings. In an embodiment of the invention allowance is made for such entities, which may be instantiated with SIO codes, and associated with persons, belief systems, religious organizations, time windows in history, stories provided by members of a service in an embodiment of the invention, and more.

FIG. 1 is a simple architectural diagram illustrating one embodiment of the invention. An object 103 is illustrated in FIG. 1 and represents one of a very large number of objects that may be uniquely associated with (instantiated by) an SIO code in embodiments of the present invention, in the broad sense of objects as described above. A mobile communication device 101 having an image-capturing capability may be used in various embodiments and is shown in this representation as imaging object 102 in image field 102. Mobile device 101 may be, for example, a cellular telephone, a pad device, or any other mobile, computerized device that incorporates image capture. Device 101 is enabled to connect to the Internet network, illustrated here as Internet backbone 105 representing all of the networks and sub-networks and interconnections that make up the Internet network, through either a local WiFi network 112 or through radio communication on a cellular network 104, either of which may gateway to Internet backbone 105.

Two Internet-connected servers 106 and 108, coupled respectively to data repositories 107 and 109 are shown, both executing respectively software (SW) instances 110 and 111, which provide functionality for the servers. One or both may be enabled to provide functionality and services to users as described in enabling detail below in embodiments of the present invention.

Assume for example that server 106 provides functionality for users in embodiments of the invention. Server 106 may in embodiments provide, through execution of SW 110, one or more web sites with one or more pages servable to users, who in many embodiments will be registered members of the SIO system, and will have user profiles, including history of activity with the system of the invention and with objects registered with the service.

In one embodiment a registered user may wish to socially instantiate an object in the system of the invention, which, because every object social instantiation is unique, and association is made between the object and a unique object code, as described above, may be done only once. In embodiments of the invention a formalized process is provided for object social instantiation.

Figure 2:
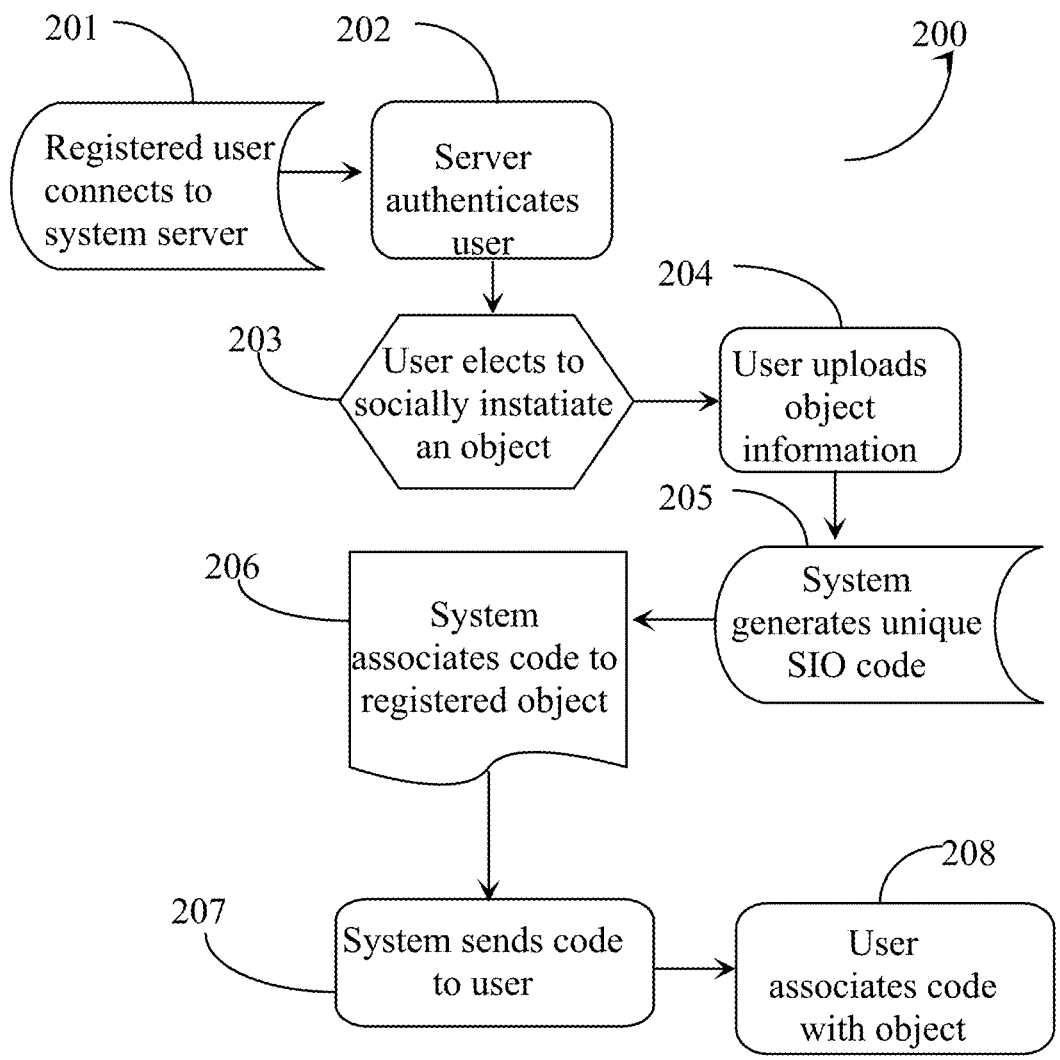
FIG. 2 is a flow chart illustrating an exemplary process for social instantiation of an object in an embodiment of the invention.

FIG. 2 is a flow chart illustrating an exemplary process for social instantiation of an object in an embodiment of the invention. At step 201 a registered user connects to system server 106. Server 106 authenticates the user through functionality provided through execution of SW 110. The server, in one example, presents an interactive interface by a browser application on the user's device, which enables the user to select from a variety of activities, and in this example the user elects at step 203 to socially instantiate an object.

At step 204 the user identifies the object to be instantiated, and uploads information about the object to the server. This information may be of many sorts, and may in some instances be quite extensive. The user may photograph the object, create video of the object, and may enter any amount of textual information or recorded audio regarding the object. In one embodiment this object information, which may include extensive contextual information, such as where the object is presently, where the object has been, where how and when the object has been associated with specific persons, and so forth, is stored temporarily while the system attempts to determine whether the object in question may already be instantiated with an SIO code and related information in databases coupled to the server. It is important to understand that this uploading of information is not a one-time process. Once an object is instantiated with a social identity the instantiating user, and indeed other users, may upload more information over time at different points in time.

If the system determines to the best of information available that the object in question has not been instantiated with a social identity, the system selects a unique SIO code at step 205. This step may, in some embodiments, have other levels of intelligence. For example, objects having social identity may be, as described above, assemblies or collections of other objects. An example is a residence, which may be instantiated by a user with social identity but will certainly comprise a considerable number of other objects, such as the roof, a fireplace, the back driveway, a box in the attic, and so on. As a simplistic example, a registered user may in the illustrated process, be instantiating a carpet in her living room with a social identity, and the system may discover that the living room itself, and the residence as well already have been instantiated and have a unique SIO code. In this case immediate association will be made in a nested, hierarchical manner, between the new SIO code being assigned to the carpet, and the SIO codes of the living room and the residence. Since the address of the residence will be known in this example, because the residence is already instantiated with social identity and code, the city or town, County, State, Country, planet, and so on may also be known, and may be socially registered as well. Codes in such cases will be hierarchically nested, and in some cases, whether or not the town or state, for example actually has an SIO code.

The nesting association described immediately above will in some embodiments be accomplished by tagging. In one embodiment it is the assigned code that is tagged. One important tag in this embodiment will be object description. In step 204 described above among the items of information that a user may upload to the system at time of instantiation is a physical description of the object, which in the case of objects that are not virtual, will usually include one or more images or video sequences.

In an embodiment of the invention data structure is provided such that each SIO code assigned will have a substantial list of tags. One of these is object description. Others may be an object history, which may include a time when the object came into being (birth of the object). A chair for example will have been manufactured or made by a person. The history may be extensive. Another tag may be association with people, which may or may not be member users of the system of the invention. A very important aspect of the invention is this association of objects, characteristics of objects, history, stories about objects, and so forth, which is described in more detail below.

It will be apparent to the skilled person that some contextual information for some objects may be fluid in nature. For example, a user may register a personal aircraft, or a locomotive, for example. Location on the planet may be known at the time of registration and assigning a unique SIO code, but as time passes the location may change drastically. In some embodiments the system may have functionality for periodically or continually updating contextual information regarding many objects, such as by accessing data from other Internet-connected sites like server 108 of FIG. 1, which might be a server hosted by an airline, for example.

Once the system has generated or assigned a unique SIO code to the object in question, the system associates that code and all of the information regarding the object in a database for the purpose in repository 107, at step 206, creating an object profile. The information will in some embodiments also comprise current ownership, and a history of ownership, if any. Importantly, in many embodiments the system also associates the registering user to the object as the first to have registered that object socially. In many embodiments this affords special privileges to that user regarding that object, and may open unique controlling functionality for the user, which is described further below.

At step 207 the unique SIO code assigned is sent to the registering user. For exemplary purpose, assume that the codes assigned are 128-bit binary, as in ipV6 address notation. In this instance the code sent may be the hexadecimal notation of the 128-bit binary, which reduces each sequence of 16 bits to a sequence of four letters and/or numbers. This will be a code with a maximum of 32 characters. In other embodiments the 128-bit binary may be rendered by the system as a base-10 number, and then rendered in scientific notation as a decimal number and a factor of ten. There are a variety of different ways that the full representation of the code may be reduced to an abbreviated form that may allow transmission and use by users of codes that are more manageable than 128-bit binary.

In some embodiments registered users will be enabled through software executing on the user's computerized appliance to have a local data repository where SIO codes instantiated by that user are stored, as well as at least partial information of associations of the codes as stored in the system repositories on the server side.

In various embodiments there are a variety of ways that the system may enable users to physically affix a code to the object registered. The system may provide, for example, the SIO code as a bar code or a QR that may be printed on the object or printed on a tag or other physical identifier that may be affixed to the object. In many cases the user may store the code received from the system and may not affix the code in any manner to the object that was registered to have social identity. Consider, for example, that a registered user is the first to instantiate the one moon of the planet Earth to the system to have a social identity. The user may receive the assigned SIO code but may have difficulty attaching the code to the moon. Nevertheless, the system knows that there is but one moon for the planet Earth, and there should be no confusion in the matter in functions in embodiments of the invention.

It will be apparent to the skilled person that a substantial number of objects may be instantiated to the system as having a social identity and may be assigned unique SIO codes. Information, including image, textual and audio information, as well as contextual information, may be uploaded to the system to be stored and usable regarding the objects registered. Very significantly, contextual information may also include association of registered users and other users to objects registered. That is, the original registering user may in some embodiments be associated in a high-profile way to the objects that that user instantiates. But the original user may associate other users with the object, or other users may be associated by the system by functionality encoded as machine intelligence in the system. For example, in one embodiment the system associates with the Facebook™ system, perhaps through an API, and when a registered user instantiates an object, that user's first-degree friends in Facebook™ may automatically be associated with the object as well. In this case there may be functionality for the friends to disassociate if they wish. The same sort of automatic association may be made for other social network sites where individuals may have associations with others.

An important issue in embodiment of the invention is that each object instantiated as having a social identity is actually unique. That is, the same object has not been previously instantiated and assigned an SIO code. It was described above that the system, at the time of registration of an object determines to the best of its ability at the time whether the object already has been instantiated and has an SIO code. The process of ensuring unique instantiation, however, is an ongoing process, and the system may determine at some time after an object is registered that the object is, in fact, not unique, and may have been previously registered. In this ongoing process correction and adjustment may be made, with appropriate notification to members.

As a result of the substantial social instantiation of objects and association with information, including contextual information and personal association of persons and other objects, a great deal of information may be stored and cross-referenced, and made accessible to users and enterprises.

Referring once again to FIG. 1, device 101 may be a computerized device under control of a user of the system of the invention and may be in this example any sort of computerized device having Internet access and I/O capability. Object 103 is in this example may be an object that has been previously registered as having a social identity and was at the time assigned a unique SIO code. The object also has, by virtue of having been instantiated as having a social identity, associated with the object's code in the system, considerable associated image, textual and audio information, as well as rich association with other objects and persons, both registered and not registered, all of which is recorded in a dB in repository 107.

A registered user may interact with the system of the invention through functionality provided by SW 110 executing on server 106 to access, review and download stored information regarding object 103, and may upload more information regarding that object, which the system will add to the already stored and associated information. This interaction may occur in a variety of ways in various embodiments of the invention.

One mode of interaction may be through an SIO code that may be somehow affixed to object 103, and which may be imaged by the user via image-capture capability 102 of device 101. A user may focus the imaging apparatus on object 103 and capture the SIO code as a QR code, which in one embodiment will initiate connection to the Internet and to server 106, displaying an interactive interface to the user, with capability for the user to review all of the associated information of object 103, perhaps incrementally, and all of the contextual information, including association with other objects and persons who may or may not be registered users of the system.

In one use case, an instantiated object might be, for example, a museum artifact connected to previous locations and curators tracked back to discovery of the object. A connected user might be a student who discovered the object. Objects may be related in a variety of ways, such as being individual paintings of a set of paintings, or individual bone types of a dinosaur skeleton, etc. There are many, many possibilities.

In one aspect a user that owns a coded object might be interested in who owns other existing copies or originals of the same object that make up a set of the objects such as a series of painting by a same artist, or a collection of compact discs of a same musician, band or composer. In one aspect, the object might be a virtual object or a copy of a real object held in seclusion or not generally available for public viewing. Members or public visitors such as member 704 may access rich information.

The information store and association for a socially instantiated object may be very rich and varied. As a single example a user may register a vintage musical instrument, a guitar, for example, once owned and used by Willie Nelson. That guitar may be associated in the data repository with a new owner of the guitar, who may be the person registering the guitar. It may also be associated with other owners, and with extensive data about Willie Nelson, relating, for example, to concerts where Willie Nelson used that guitar. Associations may also be made to similar guitars (perhaps the same make or type) owned or used by others. Intricate relationships between persons and objects and other persons and other objects, replete with stories and histories, may be made. A user might, for example, through the guitar object, find and communicate with other persons who were in attendance at a particular venue where Willie Nelson played that guitar.

As another single example an object might be a bench, a seat in a stadium, or other fixed location hosting the object in a fixed position. The code of the object in this case may provide information about actions that object has "witnessed". For a stadium seat, for example, a home run may have landed there. A dignitary might have sat there for an event.

It will be apparent to one with skill in the art that the contact brokering system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

In some embodiments of the inventions enabled in this specification the identifying mechanism may be other than an indicia or member number. In some cases electronic devices, similar to the chips used in pet identification, may be used, and a member's mobile device may be enabled to connect to the electronic chip wirelessly, or by contact, and to retrieve the unique SIO code, and use that SIO code to access data in the network, such as the website of a service according to an embodiment of the invention. In this aspect the service in an embodiment of the invention, when a new person or object is registered, may assign a unique SIO ode, and that SIO code may be encoded in an electronic device rather than printed on a decal or the like, or both. The electronic devices may be provided in many different forms that may be added to or embedded in objects.

In one embodiment of the invention an interactive interface provided by the system to a registered user may enable that user, reviewing associations of a socially instantiated object with persons, to communicate with one or more of the associated persons. In some embodiments users may be enabled to authorize or deny such communication or provision of contact information. In one embodiment a person's contact information may not be provided, but a communication may be left for the person at the network site, and the system will notify the person that there is a communication to retrieve.

Also, in one embodiment there may be a service for users who own socially instantiated items to sell or trade these items with other users. This service is integrated with the communication system in that offers for sale, buy or trade may be made to other users, or in general, and may be published in a variety of ways. A potential seller may, for example, advertise an item for sale with a price and time or other terms, and instruct the offer to be made only to a subset of other registered users who may be identified by the system from profile information, for example. A transaction system, including collecting and paying money and other value may be a part of the system as well.

In one embodiment of the invention, a variation of the coding scheme allows the system to assign a window of sequential (serial) codes to an object, and the forward progression of codes in the window are to represent the object at different points in time over a period of time. The first code of the serial window identifies the object at the time the object first enters the social universe as an instantiated object. The next 365,000, for example, in the overall series are now reserved for the same object and represent the same object incremented in age from AE (after entry) in one day increments for a thousand years. Now, anytime someone references that object in the system the id is incremented by the delta-days from AE. The example, of course, is subject to bending and stressing according to need.

In some embodiments of the invention the code assigned to a socially instantiated object may be assigned and stored in the system, with all of the information and association described above, but there may be a variety of ways that that code, once transmitted to a user, may be rendered and used for identification of objects. For example, a code may be rendered as light or variations in light, and as such, may be communicated from an object to a person seeking the code for the object. Consider a case where a reflector may be attached to an object such that impinging white light may be reflected in a range and ordered sequence of wavelengths (colors). A capturing device might have a locally executed program, compatible with SW at the system site, that could process the color sequences and translate same to the SIO code in the manner stored at the system site. A QR code might also employ color.

In other embodiments sound and sound sequence may be used to tag an object, and to communicate code by the object to interested persons. In one embodiment a binary sequence may be rendered by a series of very closely spaced lines in a surface, the lines having at least some slight depth into the surface. In this scheme there is a standard separation distance, assume 1 decimeter. So, two vertical lines side by side represent two binary one's side by side at that position in the sequence. If there is no adjacent line at 1 decimeter from another, then there is an intervening binary zero at the position. A binary sequence of 128 bits may then be represented by these lines lake a bar code, but in this case the code is read by dragging a wand across the line sequence in an agree-to direction, producing a sound that may be captured by a device's microphone and rendered by an app on the device back to the SIO code. So, codes in or on objects do not have to be QR or bar codes, they might be light emitted or sound embodied codes that may be translated as needed to the SIO code. In sound, pitch and frequency are also usable for variation for coding and code communication.

In one embodiment of the invention a mechanism is provided in the instantiation of objects by members enabling the member to classify the new object or the associated manager of the object as Anonymous, Public or Restricted. If the member selects Anonymous as a category for the object, the nature of the object will be searched, as described above, to try to establish that the object is not redundant. The member in this particular case can attach information to the object, but the member in some circumstances might not be associated with the object. In other circumstances the member who instantiates the object might be associated with the object, but the association may be hidden from other members, or at least a sub-set of other members. In various aspects of the invention information related to an object may be completely anonymous, may be completely public, or may be restricted in a variety of ways.

If the member selects Public as a classification, the nature of the object will be searched, as described above, to try to establish that the object is not redundant. The member can categorize or identify a Public object and the member's identity will be associated with the new object. In some embodiments a member may be enabled to moderate content associated with the new object by other members.

If the member selects Restricted as a classification, the member can categorize or identify the object, the member's identity will be associated with the new object, and the member may restrict what other members may interact with the object and may view and moderate any interactions.

Figure 3:
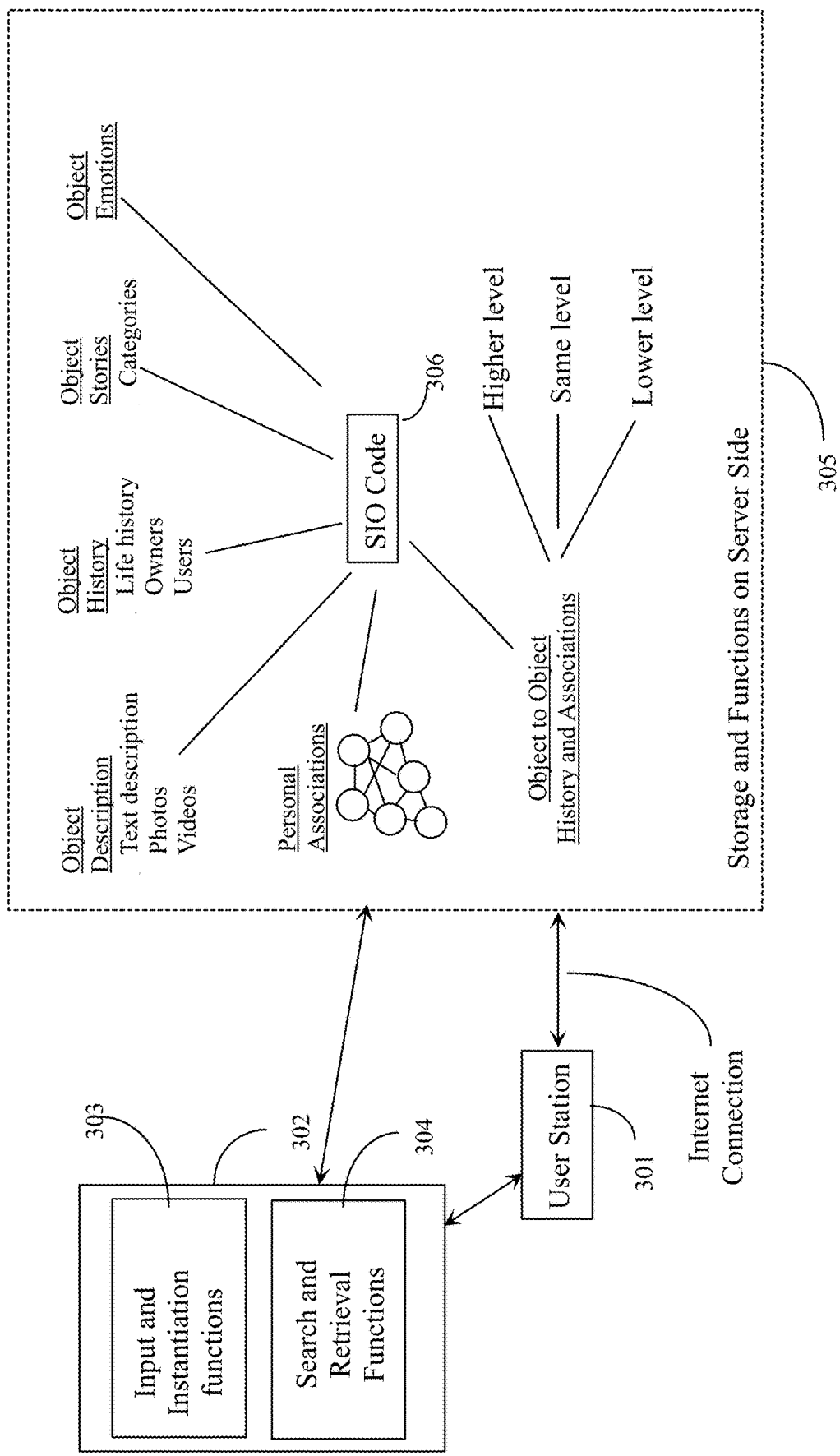
FIG. 3 is a diagram demonstrating how instantiated objects may be related (associated) in an embodiment of the invention.

FIG. 3 is a diagram demonstrating how instantiated objects may be related (associated) in an embodiment of the invention with such as people, other objects, stories and much more. A user station 301 is Internet-capable and shown connected to an Internet-connected service 305 in an embodiment of the invention. A registered user at station 301 has interactive windows provided by software (SW) 302, which may in one alternative be executed at the user's station, as provided by service 305, or in another alternative may operate a browser application wherein services and functionality are provided from the server side through interactive pages accessible through the browser application. Functionality through SW 302 is roughly divided into two categories: Input and Instantiation functions 303 and Search and Retrieval functions 304.

As is described above, every object, virtual or physical, that is instantiated by a registered user has a unique SIO code 306. Referring back to FIG. 2, when a user instantiates an object in the system, at step 204 the user enters information about the object. At this point the information is used by the system to determine if the object already is in the system with an SIO code. But after the code is assigned, the information is categorized, stored and associated with the code. Further, after a code is assigned the same, or in some cases other users, may add to the information regarding the object.

In one embodiment at step 204 an interactive guide is provided to the user to guide the user in submitting the minimum information that allows the system to properly determine whether the object is already in the system, and to adequately describe the object at a minimum when an SIO code is assigned. The user may be prompted, for example, to respond as to whether the object is physical or virtual, whether the object, if physical, is an assembly of other objects that may be in the system or may be entered in the system. Other prompts may be provided to further categorize and describe the object. The user may be prompted, if appropriate, to provide images or videos to help describe the object. There may be a step in this process wherein the system determines that the object is, in fact an assembly of other objects in the system or is an element in an assembly in the system as an object having an SIO code.

There may be a broad variety of types of information about objects that may be entered by users or determined by the system. As shown in FIG. 3, storage on the server side may have rich description of the object, history of the object, which may include owners and users and association with times and time windows, stories about the object, wherein the stories may be categorized as well, people associated with the object, and people associated with people associated with the object. The personal associations will in many instances be a rich matrix of threads. There may be as well object to object associations, such as described above, where an object is an element of an assembly of objects or is itself an assembly of other elements as objects. The diagram of FIG. 3 is exemplary and is meant to represent as association that may be far more extensive than that shown.

SW 302 in FIG. 3 is shown to include functions 303 for a user to input information, always related to an object, and to instantiate objects in the system. These input and output functions operate together in many ways. For example, a user may connect to the system to find an object in the system. The user may search for an object through entry of an SIOO code, or by keywords related to any of the categories in the system. As a single example, a user may elect to look for stories about race horses. The system might return a list of such stories much as might be returned by Google™, but from the system's data storage facilities rather than the Internet. The specificity in this list will depend on the detail of the search criteria entered by the user. There may be rich interactive guidance provided by the system to provide specificity.

Every story about a racehorse in a list that is returned will be represented simply as a title, or a few words or lines at the beginning of the story, or perhaps by a synopsis of the story. Every item in the list will be interactive for the user to go to the story and read it, or hear it recited, or watch it as a PowerPoint or as a video or movie, depending on the nature of the story as entered by a registered user, and associated with an object by an SIO code. In addition to access to the stories of the nature sought, the items in the returned list will be interactively associated with the SIO code, hence the object, to which the story is associated. This association with the object of the story may be to more than one object in a descending order of strength of association, led by the object and SIO code to which the story was originally entered. This is because a story, once entered, may be associated by the system or by a user with other objects, and also because the strongest object association may have association with other objects as well.

It may be seen, then, that there are a multitude of entry points into the associated storage at the system, and any entry may lead to a wide variety of destinations, leading to still other destinations. In this single example, the user entered the matrix of associations by seeking stories about racehorses, but a user might enter by seeking an SIO code, perhaps found physically affixed to an object, which will lead by another choice of many paths to many other sorts of information.

In one embodiment of the invention the associations, indicated by simple lines in FIG. 3, may have a range of strength, which may be by increment or by quantification in a preprogrammed range. Association strength may vary, for example between 1 and 100, either by integer, or by decimal numbers. In navigating through items of information associated with one another and with objects having SIO codes the strength of association may be one means of determining by a user where to go next after once entering the data repository through a search.

As described above, users may add information and associations to the data repository under certain circumstances. In one embodiment information entry may be closed for a particular SIO, or restricted, perhaps by the registered user that instantiates the object. In some instances the instantiating user, or another user designated as an administrator for certain SIO codes, may review and filter information added by others, and may have ability to block or to alter and edit information entered. In one embodiment there are queues for newly entered information, which may be provided to moderators for review before being released into the associated data for use by others.

One particular circumstance in which entry may be restricted is in the instance of instantiation by a user of a virtual object. This may be, for example, a fictional character or fictional object imagined (authored) by the instantiating user, and may be offered for interaction to other users only in a managed way by the instantiating user. A simple example might be a love poem authored by one user, instantiated with an SIO code, associated with other poems, works of art and people, perhaps, that the original author might open to amendment or addition by other user poets, in which the original author may be the sole judge of what addition or change might be made. One may imagine, as another example, that one user may start a fictional story with a character, and enter a first chapter, after which the story may open to other users to refine or add a character, to enter a second chapter, or a number of separate chapters, wherein a story may branch off into a wide variety of different stories by input of other users, or a single story may be jointly developed by a group of users, who may associate by agreement, and who may have discussions as to where the story may go next.

The last example opens another important point, which is that registered users in the system will typically have a user profile, perhaps with an alias and with real or hidden contact information, such that users may contact one another and interact in a wide variety of ways through the system. In some embodiments such interaction is entirely within the system of the invention through an internal text or messaging mechanism. There may also be ability by user permission, for some users to contact other users outside the mechanisms of the invention.

In a rather broad statement of the invention, in some embodiments a unique identifier, such as a mark or sequence of numbers, letters, colors, sounds, shapes and/or combination thereof that is attached to any inanimate object (physical or metaphysical) and used to humanize it as a digital social being and or digitally connect to other objects or people. This includes an object's history, its characteristics, characteristics others have assigned, personality and who it has been connected to and who is currently connected to the object.

In one embodiment entry by a registered user enables that user to search and browse through all of the content of the system, by SIO code or by other characteristics of information, following lines of association to other items of information, people, timelines, and more, all associated in the system. In some other embodiments the system is filtered for particular use cases. As one example, collaborative authorship or creation of other items of art may be a specific use case, in which associations to objects and people might be confined to just collaborative novels, to just collaborative poetry, and so on. There may be a configuration interface for a user to invoke filters to just particularly desired subject matter.

Entry into the system was described to some extent above, such as by invoking a search interface in a number of ways. It was described that a user might simply enter an SIO code that is known to that or another user or might be affixed to an object in some manner. There will be, in alternative embodiments, a considerable variety of ways SIO codes might be entered. In some cases one might simply image an object having an affixed SIO code, enter that to the system, and the system will translate the code and connect to the unique object associated with that code. Such a code might be a bar code, a QR code, or a pattern of dots burned into a surface, for example. Once the system associates the entered code to the unique object associated with that unique code, all of the associations of various sorts and strengths are open to the user having entered the code, and the user may then ascertain all sorts of information, such as history of the object and people associated with the object.

A tree may be instantiated as an object by a registered user. The tree may then be cut down, milled, and turned into other objects which may in turn by instantiated in the system of the invention. Other objects may be, for example, furniture, which items of furniture may be associated with the original tree object, with the person who cut down the tree, with the lumber mill that milled the tree into useful planks and such like. A filter in place may limit access to associations that begin with the felling of the tree, or may go back further to when the tree was planted, for example.

A building as an object may be instantiated with an SIO code as well as other objects and people in or associated with the building and a neighborhood or borough, city county, or state where the building may be known to reside. A user may find the history of the building, what businesses were started there, who started them, when they started, what objects were used and who used them.

A ship in a mothball fleet may be instantiated, along with items in the ship, and objects like a flotilla or geography including the ship. The ship may eventually be scrapped, and portions of the ship may be made into cell phone cases, which may be associated back to the ship.

A book may be instantiated—read by my father—then by my mother—and so on. Through search a user might discover who has read THAT book, history of those persons, people who have read similar books, and other associations of various strength may be followed. Associations may be made to similar books by genre.

Geographic locations may be instantiated with information entered and associated as to what people have been at this location, what history may have occurred at a location, and more.

On occasion, a happenstance may be instantiated and assigned an SIO code. For example, a person proposes to his sweetheart at a particular location. That occasion is associated with other people and other occasions that are linked by intersection with the occasion.

A celestial object like a planet or a star, or indeed a galaxy, may be instantiated, and information may be entered of many different sorts, such as relative placement in the universe relative to other celestial objects, as well as age, prognosis for super nova, brightness, and much more.

Items of pottery may be instantiated and associated with artisan, other artisans, type, art genre, availability, age, and much more. Other sorts of artwork, such as paintings, may be instantiated with association to a great deal of information, such a water color or oil painting, brushes used, similarity to works of other artist, people who have seen a painting, emotional reactions by persons to a painting, and so on.

An instantiated relic from the French Revolution might connect people to the history and the people who fought there as well as everywhere that relic has been and who has connected with it, and also with the many stories of the revolution.

A particular seat at a sporting event might be instantiated with an SIO code on the seat. Associations may be made to actions that seat has witnessed. A home run may have landed there. Someone has had season tickets in that seat and many people have sat there over time.

Groups of people, like the Rolling Stones as a band may be instantiated, and quite rich associations may be made to performers, persons in audience at various times, type of music, music history and repertoire, and so on.

Figure 4:
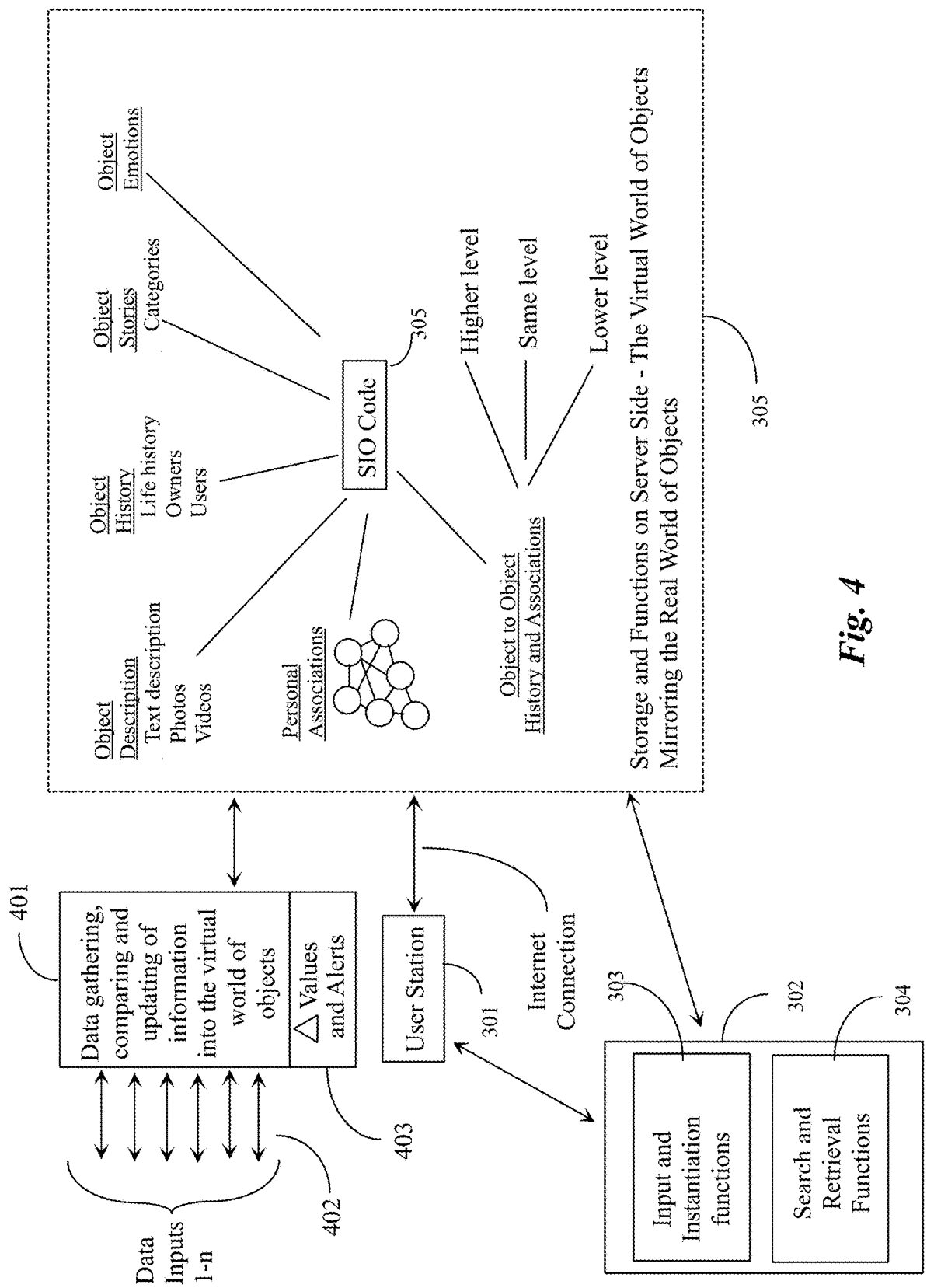
FIG. 4 is a diagram illustrating architecture and functionality in yet another embodiment of the invention.

FIG. 4 is a diagram illustrating architecture and functionality in yet another embodiment of the invention. FIG. 4 is similar to FIG. 3 in that the service 305 of the invention is illustrated but labeled as a Virtual World of Objects Mirroring the Real World of Objects. It is true that many objects instantiated and associated with an SIO code in the virtual world may be insubstantial and objects in only a broad sense of the word. For example, it is permissible for members of the service to enter and instantiate objects that me be purely imaginary, like Superhero characters. A substantial subset of the virtual world of objects instantiated by members are virtual entities mirroring real-world entities. A member, as one small example, may enter and instantiate an automobile as an object in the virtual world; not a fantasy automobile, but an automobile owned by the member and driven on a daily basis. In such a circumstance the automobile in the virtual world, associated with an SIO code, becomes a virtual associate of the object in the real world.

In the circumstance just described regarding virtual objects and their association to real objects, the virtual objects are data points in a database, associated with stored information that in many cases is entered by the original member that instantiated the object, and that may have a great deal of associated information added by other members. The real objects in the real world have space and time reality that the counterpoint virtual objects do not have.

System 401 illustrated in FIG. 4 is a system comprising hardware, one or more memory elements, and one or processors executing coded instructions. The hardware includes a plurality of input feeds 402 labeled 1-n, and a data connection to the virtual world. Input feeds 1-n may be drawing information from a variety of sources, such as a Global Positioning System (GPS) Device in an automobile that may have been instantiated into the virtual world. At the time of instantiating the automobile the member doing so may have access to selections enabling tracking of the automobile. That is, the member may be presented by the system with a configuration interface wherein the member may identify a GPS device (the one in the car).

With GPS enabled for the car that is instantiated, system 401 will look for signals from the GPS through one of feeds 402, and finding same will update information associated in the virtual world with the virtual object mirroring the car, so that real-time position (space and time) for the virtual car may match real time position of the actual car. The virtual world car now has time and position of the real world car.

The car example provided just above is but one small example of the sorts of information that may be anonymously collected by system 401 and stored into the database defining the virtual world. System 401 may monitor news releases and broadcasts, and parse such for references to objects that have counterparts in the virtual world. This collected intelligence may be added to and associated with the counterpart objects.

Another part of system 401 is subsystem 403, which provides delta values and alerts. In the example of the car above, as GPS is tracked for the car, new time and position information may be developed, and reports may be made to the owner of the car that the car has moved twelve miles SSE, for example, in a time delta of 30 minutes. Members may be able to configure their own profiles and system functions to provide alerts in certain cases. In this manner circumstances in the virtual world may be kept relatively close to circumstances in the real world.

Figure 5:
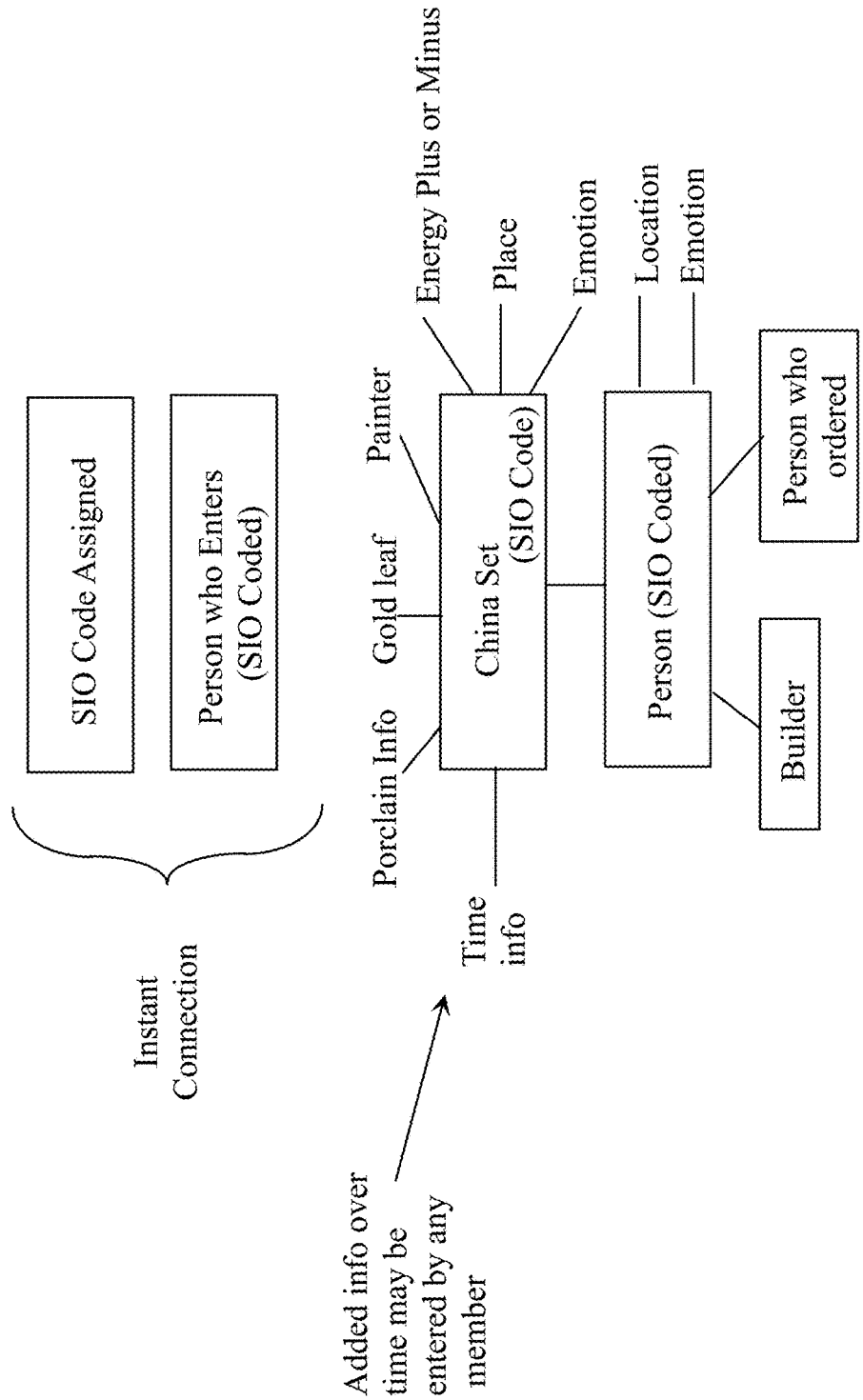
FIG. 5 is a diagram similar to that of FIG. 4 as a more specific example of instantiation in an embodiment of the invention.

FIG. 5 is a diagram similar to FIG. 4A showing how adding a new SIO code might work as related to grandma's china, as a more specific example of instantiation of an object and association of the object with other objects and people in a more specific situation. FIG. 5 illustrates how one SIO coded object relates to another to give an idea of how broad is the use of object instantiation. Configuration at time of instantiation and afterward connects the set of china to a person, both of their histories, locations, the parents and person who gave birth to the individual making the china as well as the parent of the person getting the china.

Figure 6:
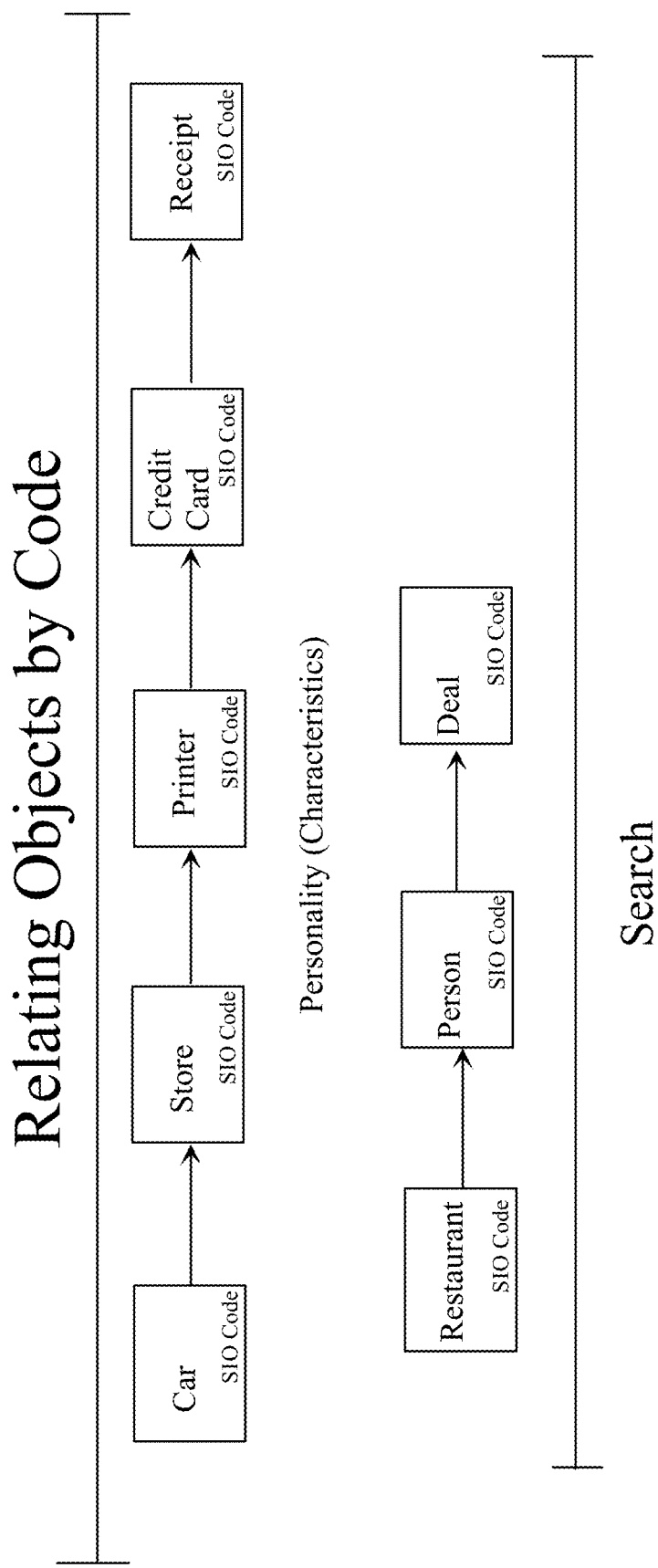
FIGS. 6 and 7 illustrate an example of how the system may tie SIO codes together in a virtual world in an embodiment of the invention.
Figure 7:
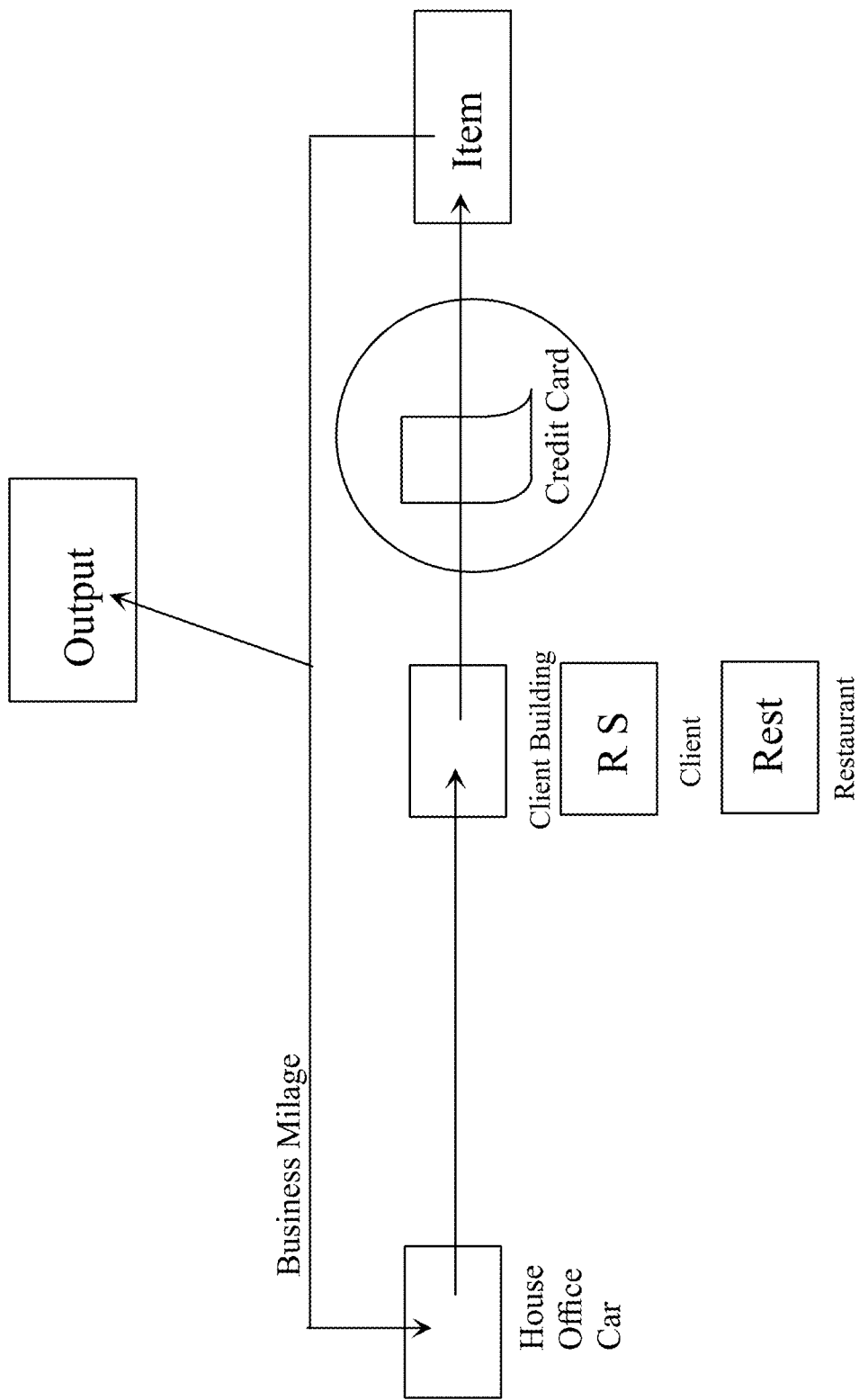

FIGS. 6 and 7 illustrate an example of how the system may tie SIO codes together in the virtual world. The idea of an individual car, a store, an item in the store, a credit card, and a receipt all having SIO codes in the real world, when brought together create a relativity that may be recreated in the virtual world to make automatic direct associations that can be used to fulfill a requirement by other systems in the real world. This example shows how all that information of where a car was located, who was in it, when it left, how far it went, to what location, what the person purchased, the credit card they used, a copy of the receipt and their return drive can be reproduced in the virtual world to interface that data with an accounting software package in the real world to automatically input business transaction and mileage. Ability to determine and associate SIOs in both the real world and our virtual world also enables making available predictive analysis and real time searches. The diagram shows such searches and predictive analysis:

What restaurants in an area are used for business deals?
Is a store more of a consumer store or business?
What are the average distances people will drive to purchase a printer?
What is the carbon footprint of purchasing a printer versus having it sent to you?

Figure 8:
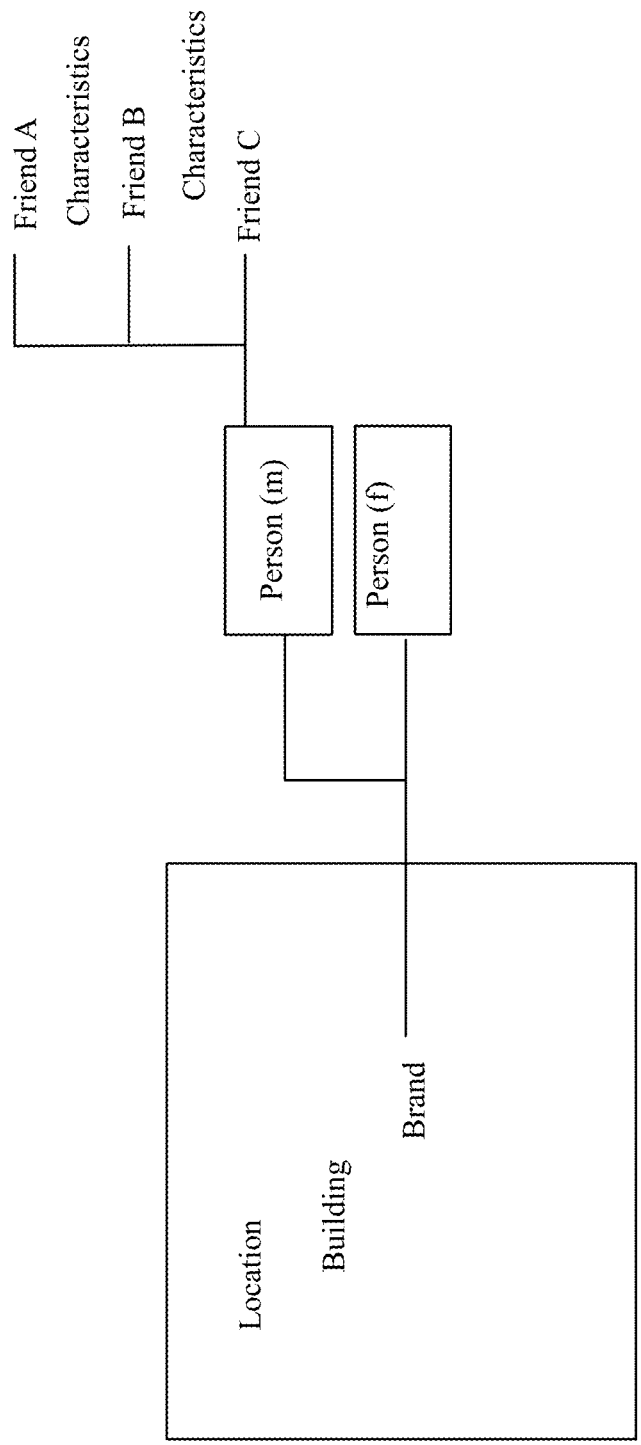
FIG. 8 is a drawing showing a potential hierarchical system of SIOs in both the real world and a virtual world in an embodiment of the invention.

FIG. 8 is a drawing showing a potential hierarchical system of the SIOs in both the real world and virtual world. In this model, the Location data table represents the "parent" part of the hierarchy, while the Building represents the "child" part of the hierarchy. To move farther down the control system, the Building data table represents the "new parent" part of the hierarchy, while the Business 1's SOI located in the building, Business 2 SOI's located in the building, represents the "child" part of the hierarchy. And it continues creating parent-child relationships as more relationships are made to the SOI's. In contrast to typical tree structures, in this model each SIO can be a child or a parent at the same time to different SIOs.

Figure 9:
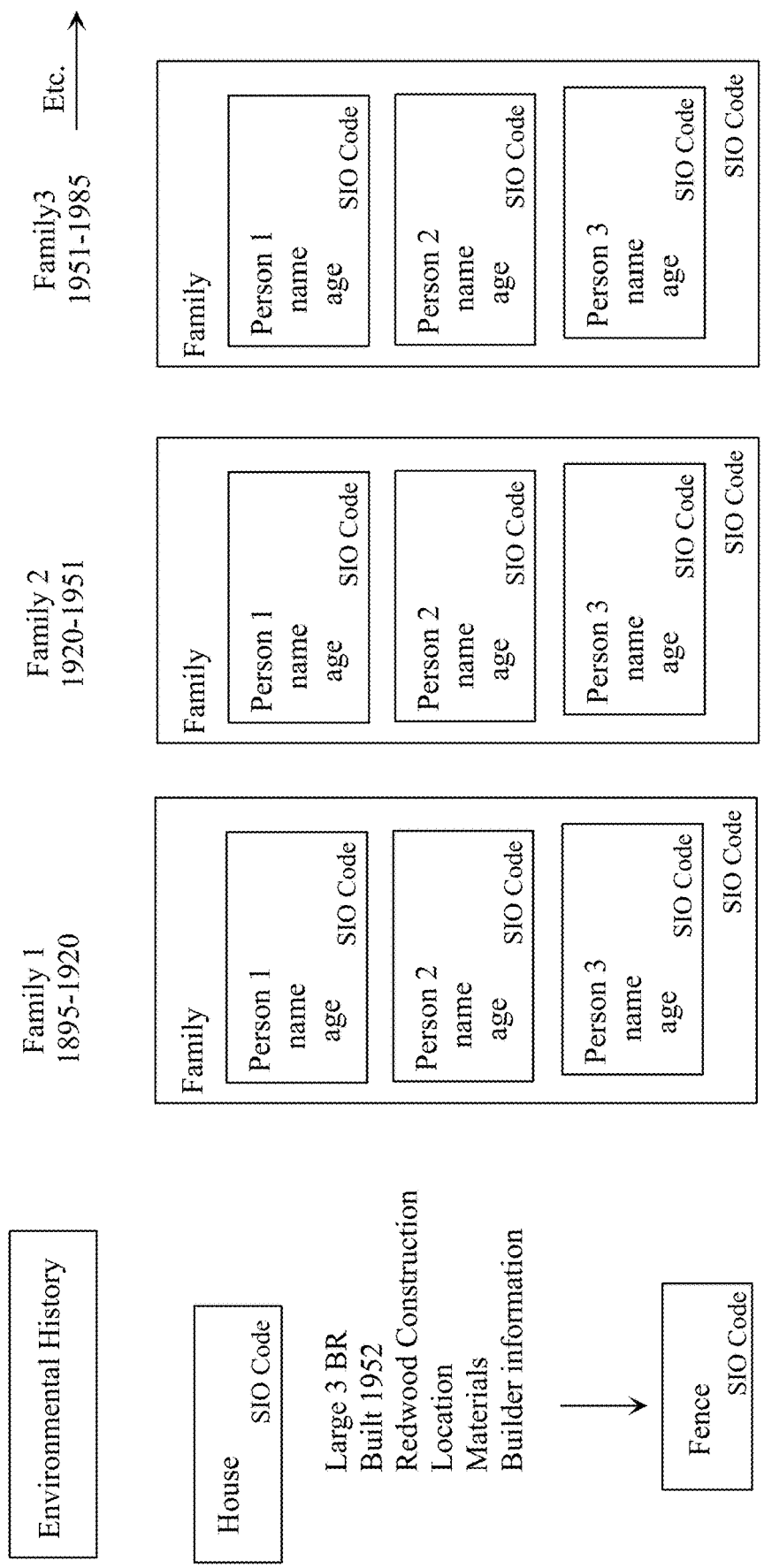
FIG. 9 illustrates how the system in an embodiment of the invention can potentially tie SIO codes of different families living in a specific home over a period of time.

FIG. 9 is an example of how the system can potentially tie SIO codes of different families living in a specific home over a period of time. The ability to follow the history of a home, when it was built, the people that lived in the home and where each of these people are now is not available today, but it can be available in the virtual world. Even the items that were and are in the house can be instantiated, assigned SIO codes, associated hierarchically with a wealth of information, and be tracked and found or verified if needed.

Figure 10:
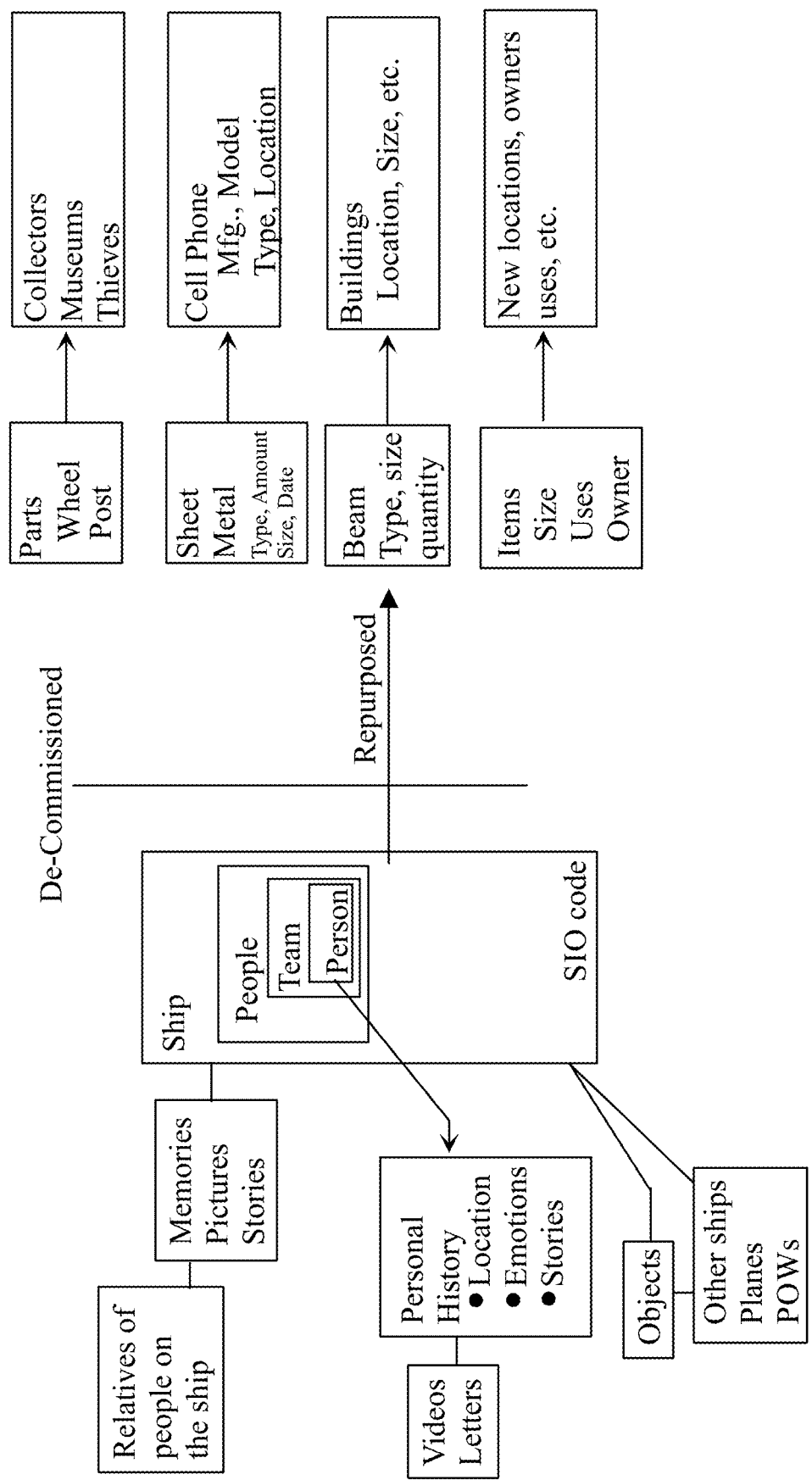
FIG. 10 is a diagram of a complex object having an SIO code showing how one SIO code can resolve into many SIO codes.

FIG. 10 is a diagram of a complex object having an SIO code and how one SIO code can transition into many SIO codes. The example illustrates a ship that was built in the 1950's. The diagram shows how the ship, the people in the ship, the parts of the ship can all have SIO codes and histories. In this example, after the ship is put out of commission, each of the parts can be issued a separate SIP code and these can be tracked. If the ship was dismantled the parts can be repurposed and used to make different items. Each type of item if it were to go to different manufactures could be tracked as it is made into parts, sheet metal, iron beams, and blocks of steel. If it was then used to make cell phones, went to a collector's museum, used to make a skyscraper, or melted to make a gun—the entire history of all the SOI could be tracked at different time in their history.

Who was on the ship?

When was the ship built?

What battles was the ship involved in?

My cell phone carries the metal used in the 1950 Destroyer that survived all attacks that Robert Harris was on.

In another important aspect of the invention a very sophisticated statistical ability is provided whereby the nature of objects, associations of persons with objects and objects with objects, including thoughts and emotions entered by persons about objects, and personal characteristics and profiles of persons with objects are tracked relative to time, and periodic snapshots of segments of the database may be made, and analyzed in a wide variety of ways, with statistical representations of such snapshots made available, either publicly or in a restricted manner. Segment definition may be made in real time in a search facility, and any one or more of a wide variety of algorithms may be called to provide statistical output relative to one or more segments. The algorithms available for statistical analysis may be created in real time (on-the-fly) as well.

As perhaps a rather simple example, a member may be authorized by the system to seek statistical output by defining a segment as all instantiated objects that are commercial cruise ships over a particular tonnage and belonging to any of three commercial cruise lines, and analyze information in the system as to, for example, how many persons of a particular ethnic origin and above a threshold income level booked passage on these cruise liners in a particular two-week time window of the previous calendar year.

As another simple example, the segment may be limited to a single painting hanging in the New York Metropolitan Museum of Art, for which persons who are associated in the database with this painting have entered emotional reactions to this painting at various times. The query in this example may be to track how emotional reaction to this painting may have changed over a prescribed period of time over the totality of people associated with the painting and who have entered such opinion, and how reaction may have changed depending upon one or more of age, ethnicity, gender, height weight, hair color, or any other characteristic of such persons that may be available in personal profiles of the persons in the system. Characteristics of course may be combined in different ways in different interrogatories in such analysis.

The skilled artisan will recognize that such statistical ability combined with search criteria, segmentation criteria, and the great deal of information and variety of associations in the system provides a very valuable tool for personal, private and commercial analysis, that may be leveraged in many ways by an enterprise hosting such a system.

In some embodiments of the invention, related to statistical tracking and reporting, information associated with one object may be automatically associated with one or more other objects as well. This function enables a member, for example, to enter information about or for a specific object, which information may be then associated with all objects that share a particular characteristic with the specific object.

In one aspect of the invention it is important to understand, as described in different places above, that an "object" in the concept of the Social Identity of Objects as described in many aspects in this specification, is not limited to objects having physical reality. Any identifiable entity that may be expressed as a noun in language may be an instantiated object in this SIO concept. There is no general agreement, for example, that religious figures have physical reality, although many believe that they do in many cases. So, as a very broad definition, if you can imagine it and name it, it may be instantiated as an object with an SIO code in the SIO database. Many such objects may have mostly verbal or textual descriptions associated in the SIO dB, but may also be linked to art works, sketches or pictures, for example, provided by the instantiating member or others, according to each person's understanding of the nature of the object, whether real or imaginary, regardless of opinions as to whether an instantiated object is real or imaginary. Again, any entity that may be imagined and named, for which a description may be provided, may be instantiated in the SIO system and assigned a unique SIO code, and that object may be associated in a number of ways with the person who initiates the instantiation.

One very important instance of object instantiation has to do with the Internet network and the vastly interconnected instances of information sites, termed nodes or websites, each of which typically has been assigned an IP address and a URL comprising a domain name, that uses that IP address to connect interested people in the Internet network to individual ones of such nodes. It is well known in the art that persons operating Internet-capable appliances may execute browsing applications, like Google for example, and may connect to such information sites by asserting a URL, or in some cases an IP address directly, and may use interactive interfaces presented by the browser program in interaction with website, to access information and activities and services provided by the website, including further navigation to pages in the site and other sites. This, of course, is how the SIO system works as well.

In one embodiment of the instant invention a person may, through procedures described above, instantiate a website in the Internet as an object in the SIO system, assigning a unique SIO code to the site that is different from the IP address or URL of the site. The instantiating person may enter description of the site, which may include the IP address and the URL, or multiple URLs associated with the site, and any other description that may be associated with each such site in manner as described above.

The description above regarding websites may be extended to nodes in the Internet of Things as well, with different nodes in the IoT being instantiated as objects in the SIO system, each with a unique SIO code, such that such network objects may be related to people and other objects in the SIO system in the many ways described above.

In one embodiment o the invention the population of Internet sites instantiated in the SIO system by SIO code may be accessed through the SIO system by asserting the SIO code, which automatically in this embodiment asserts the URL and/or IP address. In various embodiments of the invention the SIO system may crawl the population of Internet sites in the SIO system, and may cache sites by various criteria, including textual, audio and image content, and search and browse functions may be provided in very specialized ways to facilitate enhanced search functions for members of the SIO system.

The skilled artisan will understand that the descriptions made above, some with reference to particular figures and elements in figures, are all exemplary of the architecture and functions that may be provided in embodiments of the invention. There are many other objects and sorts of objects that may be instantiated in the invention, and many functions in entry, search browsing, editing information, and such like that will fall within the spirit and scope of the invention.

The Social Identity of Objects is comprised of an object's continual positioning in time and space, it's appearance, relationships with other objects and the interactions with or effects on human and non-human entities.

The software that executes on the Internet-connected server that enables instantiation of objects is termed Socrates by the inventors. The software in various aspects of functionality also enables instantiation of SIO data for each object in the system, and recommends data based on time, place, space, written tags, photos, videos, descriptions, commonality, and emotions to be displayed through an interface, among other functions described elsewhere in this specification.

The SIO code is attached to or associated with each object, whether it be physical or metaphysical and is used to reference the object when new data associated to the object is received or communicated.

In the system no two objects are exactly the same. From the time they are instantiated they are, by nature, their own individual object and have their own specific set of attributes. Much of this differentiation is caused by human, planning, design or interactions, but some can be created in the virtual world as well. This model of creating social identities for objects may have a significant impact in quests for understanding and exploring virtual reality and artificial intelligence as well as enrich existence for persons interacting with the system, and the objects in the system and counterparts in the real world.

The skilled person will understand that there may be many focused applications and use cases to which aspects and features of the present invention, in various embodiments may be applied. One such use case may be application to museums, art galleries, and other managed, curated and/or natural collections of objects.

SIO in a Museum or Collectibles Application

In application to a museum the SIO system may have a dedicated database with many of the attributes described above. Notably every person acting in an agent capacity for the museum, sometimes termed, for example, curators, will be assigned a unique SIO number, as will every person registered with the museum and enabled to upload digital files, such as photos, videos, audio files, PowerPoint files, PDF figures, figures in vector drawing programs, and essentially any known sort of digital file, to add to the evolution of a social identity for individual ones of objects instantiated as museum objects.

In the broader aspects of the SIO system as described above, any registered person might be enabled to instantiate an object, to which an SIO code may be associated. In the more narrow aspects of the SIO system as applied to a museum or other finite collection of objects, the museum objects may be chosen and displayed in the museum by agents of the museum, and agents of the museum may instantiate the SIO objects associated one to one with the many physical and virtual museum objects.

As museum objects are instantiated in the database by agents of the museum, individually or in batches, each is associated with a unique SIO code, and that SIO code is associated with the SIO code of the agent who instantiates. Further, objects that are not museum objects on display in the museum, but that may be related to such objects may also be instantiated, and cross-associated with the museum objects and the agents, As the museum database matures, members of the public and of other enterprises, as well as of other museums, may be enabled to build on the overall stored social identity of individual ones of the museum objects by uploading descriptions, stories, experiences, pictures, videos, and many other digital files in all known media formats, each assigned a unique SIO code as the file is added, and associated both with the user adding the descriptive material and the museum objects.

Once in active use, the SIO system dedicated to the museum may have a substantial plurality of SIO objects associated with the physical museum objects, and these may be categorized in different hierarchical collections. Users may interact with objects by viewing, uploading memories, digital images or videos, or any other type of text or digital media, through their own, or publicly available, digital devices, in print, through kiosk type displays, or in person at the museum. The collections of information in widely disparate digital files, as the social identity of the objects to which the information is associated by SIO codes, may be viewed and otherwise digested, that is, experienced, and the evolution of the social identity of individual objects, adds meaning and social value to the museum objects.

How it Works:

A Curator, or moderator, (an agent) of the museum uploads an image or other recognizable representation of an object in the museum, or objects, people or events, related to the museum. These instantiations may be singular or in batches.

The museum object is assigned an SIO code, and so is the image representing the object.

The SIO code of the image exists in a hierarchical way with the subject and is connected by attributes in common—similar tags—with other object SIO's in the system.

Visitors may attach their own images, stories, other SIO codes to SIO codes related to objects in the museum Users outside of the museum can add memories, images and other content to the object's SIO codes By its very nature the objects in the museum connect users of the system with many layers of objects, humans, places and events related to the objects in the museum and the museum itself.

The information provided by the users give the museum curators and owners of the objects in the museum visibility into the popularity, significance, history and provenance of the objects in the museum, or related to objects in the museum over periods of time.

By adding media, comments, experiences and stories to the SIO codes of the objects, the user will be forever connected to the object, the museum and the objects related to the object and the museum.

In one example of how SIO Codes may work in a museum, an individual or groups of visitors may take a photo in front of the museum or an object in the museum. That photo would be related to the object and the person in the photo. By assigning an SIO code to the image and knowing that it is related to the person in the image and the object in the image, a collage or mosaic that represents the main object in the image and is comprised of the combination of two or more images taken by two or more people would be rendered and given a unique SIO code related to each of the humans and other SIO codes related to the humans and other objects in the system.

In one example, the objects with SIO Codes and their Social Identities can be presented in different mediums such as a kiosk, controlled monitor or Television or other ways to display and interact with the objects whether connected to the internet or not.

In one example SIO Codes incorporated in such a way to create interactive learning and/or gamification.

In one example there is an ability to take a physical item's SIO code and its attributes into the virtual world. Physical objects using their attributes and those like them to interpret and react to events and human activities occurring in the physical world through gaming. Placing the Physical Object in the Virtual World giving the Virtual Worlds Object chosen attributes to be used in different Virtual Worlds giving them selected use of those attributes. An example would be a famous soccer players cleats used in the World Cup Soccer game that was able to score an amazing number of goals or a method to the goal and allowing those to be associated with a particular virtual player for a specific given amount of time.

Furthermore in this example, the memories associated with the client in the real world can effect and change what the cleat does in the virtual world and the actions in the virtual world will impact the identity of the object in the physical world in the present and over time as the data related to the experiences grows and evolves over time. It is possible for virtual objects to be instantiated higher up the hierarchy and to have representations in the physical world be lower and point to the original object, in this case a virtual object.

In one instance the SIO Code is used to access the data stored within the SIO network. By accessing the network through the code, users can transfer ownership of or give access to the use of the SIO code to another user in the system or authorize the continued storage of the historical information related to the object.

One example is an ability for the museum to identify SIO's and what SIO's are of interest to create a linear flow through the museum exhibits so (objects that are less seen but of importance) that the museum would place these Objects strategically based on the persons passions or interests in the flow to get more interest and/or value.

Another use case is an ability for the museum to add objects that are not physically in the museum but are given permission by the objects owners to be in the collection virtually. This allows visitors to the museum to experience rich content and the social identities of objects related to but not in the museum. This could extend beyond physical objects to things such as movie clips, songs, visual and audio media related to the subjects associated to the museum.

The museum might also produce replicas and prints related to objects in the museum. Each replica or print would be lower hierarchically than the original object, and would represent a child (Replica or print) of the parent (Original) by being individually instantiated, and connected to the parent and the rest of the children by association.

Another interesting layer of the SIO network in the museum space is an ability of the system and the museum's moderators to visualize the reactions by visitors to particular objects based on their demographic data combined with the reactions they have had to other objects in the system compared to the way others have interacted to similar objects. For example, visitors from China may have similar reactions to religious objects, whereas natives from Puerto Rico may commonly use words like, "Saint", "Hero", "Primero", when referring to an athlete like, for example, Roberto Clemente. Women, children or people from different locations may use different, but similar words and have differing, but similar reactions as others like them. The system may also track the difference of opinions and vernacular over time.

Users of the system will naturally have emotional reactions to physical objects, people, places or events. The system can gather these emotions and synthesize the combination of emotions in such a way that the end user can experience the emotions associated with the object through sound, light, color or descriptive text, or other modalities.

The museum and the objects also share these emotions among each other in a hierarchical manner. For example, the emotions associated with all objects in the museum will be associated with the SIO code of the museum itself.

One SIO attribute that will continue to be surfaced is the notion of prominence and popularity of objects. By their nature, objects in museums are interesting to people and have a level of significance. The more that visitors virtually or physically interact with the objects, the more they will increase in significance. This is especially the case when a person of significance interacts with the object in the SIO Network.

By their very nature, objects in museums are significant. They may hold significance based on the materials they are made from, their rarity, value, their existence in time and space, the events they have "witnessed" or their relationships to historic or significant people, as well as many other contributing factors. For this purpose and reason, there may be a special or particular SIO code, input field or an internal ranking system that identifies or gives these objects, people, places or things, more significance within the system and in the real or virtual worlds.

An object can also be associated with, shared or transferred principles or standards of behavior; rules, value-monetary and/or sentimental, rarity, beliefs, emotions, ideals, ideas, culture and any number of other values or behaviors attached to itself and shared with other objects in the SIO system and in the real and virtual worlds.

Physical representations of SIO codes will allow visitors to easily access data related to individual objects in the museum. This can include QR codes, bar codes, or a unique sequence of digits that can be entered into a mobile device or scanned. It can also include a unique representation of an SIO sticker or placard optimized for individuality whose purpose is to display and/or allow the user access to view or instantiate objects related to the subject of the physical indicator's social identity. A unique SIO indicator would keep the system closed and more secure while optimizing the ability to create strings of SIO codes in direct relation to the subject, its children and the changing form of the subject over time.

In one implementation the museum may sponsor an Internet connected server executing coded instructions from a non-transitory medium, the coded instructions providing interactive interfaces for both agents of the museum, in the many activities and responsibilities of the agents, and also for registration and activities of other persons as patrons of the museum, who may by registration, be enabled to add material to the social identity of objects of the museum, and to experience the social identity of objects as evolved by the additions of other users.

In one implementation there may be an application that may be installed and executed on a mobile device through which users may interact with the SIO system of the museum. This application may allow anyone with an account to add photos, posts, short videos (21 seconds) to any item in the museum or subject related to the museum that is already in the application. The application will allow account holders to share object input by email, social channels or other digital, virtual or physical mediums to display their memories and/or solicit memories from their friends, family, acquaintances with similar interests. This version of the application may also allow users to begin to create their own individual unique identifiers for subjects or objects in their possession or of interest to the person. This version would allow private storage and display as well as public storage and display of instantiated objects and their attributes.

In some embodiments there may be search functions provided for various purposes. For example, there may be a search function operable for agents of the museum enabling the agents to search the database using a variety of search criteria. For example, an agent may search SIO codes, names of objects, categories of objects, objects by dates of entry, and a rich variety of other search terms, which may enable agents to track and publish evolving social identity of objects and categories of objects.

Users who are not agents of the museum, and who are enabled to upload information to be associated with objects and groups of objects in the museum, are each assigned a unique SIO code, and that unique code is associated in the system with each file that the user may upload. In some embodiments the users that are not agents are registered to the system, and there may be a personal profile, which may comprise at least some contact information. Some such users may elect to have their personal information hidden, and some may elect a more public persona.

In one embodiment coded instructions executing on a server may provide interactive interfaces for users to browse museum objects and to upload media to add to the social identity of museum objects. There may be further functions to afford communication between users, and enablement may be dependent to some extent on common interests, as indicated by on-line behavior and activity of the users.

Tracking and publishing social identity of objects and categories of objects is an important function in the invention, as this ability makes possible many of the expected outcomes, as listed just below:

Expected Outcome
  Objects in the museum would have a public identity
  Objects in the museum would become more valuable
  Objects in the museum would connect people with similar interests
  Objects in the museum would gain wider circulation
  Objects in the museum would be able to be connected to objects, people, places and events outside of the museum In yet another embodiment of the invention an Input system is provided to guide a user in instantiating objects.

Figure 11:
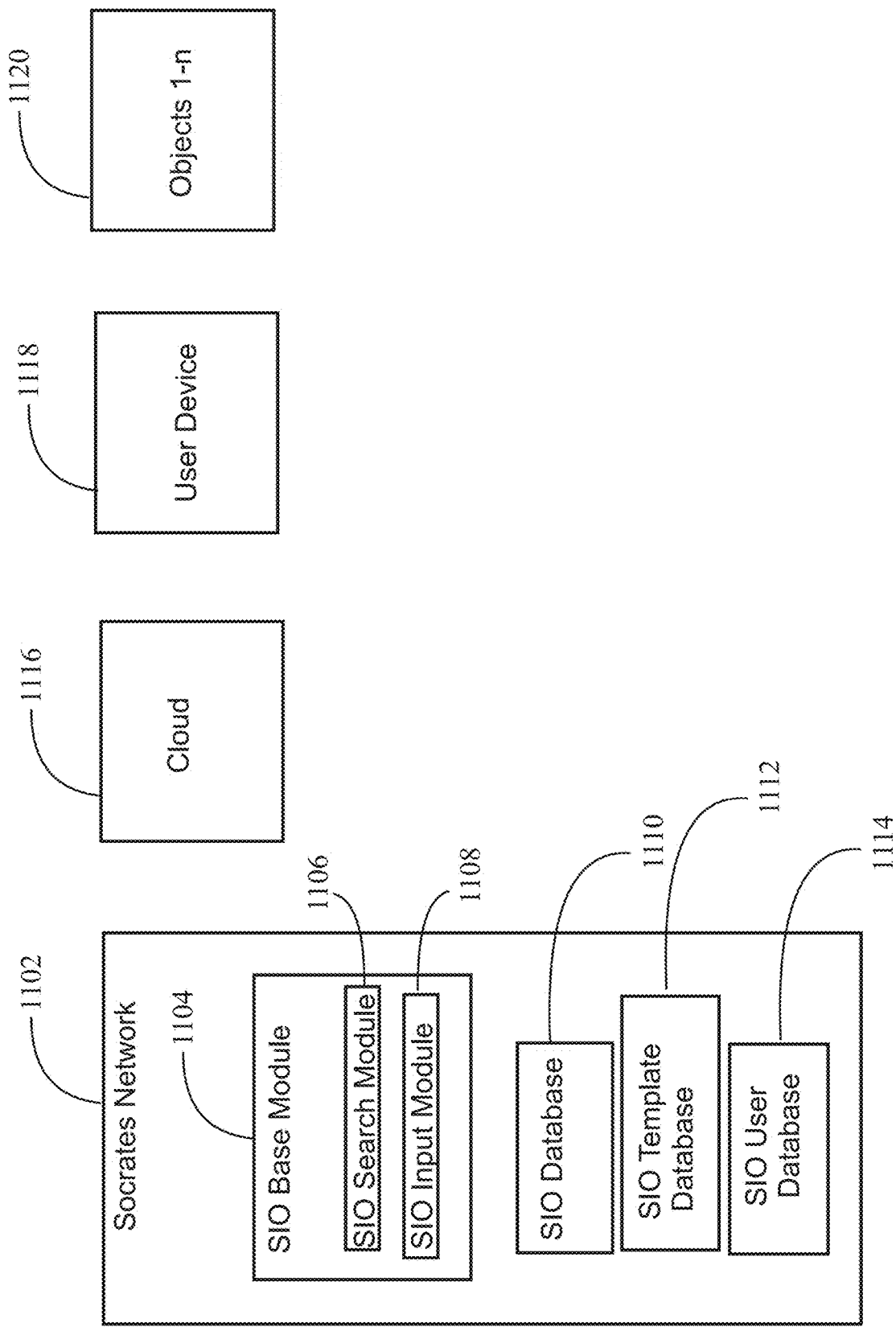
FIG. 11 illustrates a Social Identity of Objects Input System.

FIG. 11 illustrates a Social Identify of Objects Input System. This SIO Input System may comprise a Socrates network 1102 that may collect and store the social identity of objects (SIOs). The Socrates network 1102 enables instantiation of SIO data for each object in the system and recommends data based on time, place, space, written tags, photos, videos, descriptions, commonality, frequencies, and emotions to be displayed through an interface among other functions. In one embodiment of the invention, the Socrates network 1102 comprises an Internet-connected server with an SIO database 1110. The Socrates network 1102 executes an SIO base module 1104 by a processor from a non-transitory physical medium, one or more interactive interfaces presentable by the Socrates network 1102 on a user device 1118. An SIO database 1110 enabled by the SIO base module 1104 storing data describing real or virtual objects in the SIO database 1110 in a structured manner. A registration process enabled by the SIO base module 1104 whereby users using individual ones of the user devices 1118 are registered as members of the Socrates network 1102 with login and identifying information, an instantiation process provided by the SIO input module 1108 enabling instantiation of virtual objects in the SIO database 1110 by registered members from the user devices 1118, wherein a user is enabled through one of the interactive interfaces to propose a new object for instantiation by entering at least a name and a description for the new object, the system determines by comparison with stored information about virtual objects in the SIO database 1110 if the proposed object is in fact new to the system, and if so associates a unique instantiation code with the new object, instantiating the new object in the SIO database 1110, and a search process provided by the SIO search module 1106 enabling registered members to search for SIOs associated with objects in the SIO database 1110 from the user devices 1118, to access information about the objects when returned in the search process, and to edit the information about the objects under particular circumstances. Every object instantiated is associated uniquely with the registered user who first instantiated that object, and privileges in controlling information about that object are reserved for the instantiating registered user. Embodiments may include an SIO base module 1104 that may allow users to input and search for SIOs. Embodiments may include an SIO search module 1106 that may allow users to search through the library of SIOs in the SIO database 1110. Embodiments may include an SIO input module 1108 that identifies the correct input template to retrieve from the SIO template database 1112. The input template may then be used to collect information associated with the SIO to be collected. Information associated with the object may comprise an object description by one or more of audio files, text files, photographs, and videos, object history including owners, and stories about the instantiated objects. Also, in one embodiment, structured associations are made and recorded between objects and other objects and between objects and registered users. Also, in one embodiment, emotions are associated with objects. Also, in one embodiment, an object instantiated and associated with a unique code is composed of other virtual objects associated with unique instantiation codes and unique descriptions. The input template is specific to the type of object for which the SIO is input. For example, if the object is a car, the input template may include fields such as the vehicle identification number, the make, model, accident history, etc. Embodiments may include an SIO database 1110 that stores information associated with object's SIOs. In one embodiment of the invention, information about virtual objects stored in the SIO database 1110 comprises object description by one or more of audio files, text files, photographs, and videos, object history including owners, and stories about the instantiated objects. Also, structured associations are made and recorded between objects and other objects in one embodiment and between objects and registered users. Also, in one embodiment, emotions are associated with objects. Also, an object instantiated and associated with a unique code is composed of other virtual objects associated with unique instantiation codes and unique descriptions in one embodiment.

In one embodiment, the system further comprises a process enabled by the SIO base module 1104 by which the system associates instantiated virtual objects in the SIO database 1110 with objects in the real world having the same or similar description, periodically tracks information and circumstances regarding the real-world objects, and updates information regarding the instantiated virtual objects in the SIO database 1110 with the information and circumstances in tracking the associated real-world objects. Also, in one embodiment, tracking circumstances include noting real-world objects' geographic position and movement and storing that information associated with the instantiated virtual objects. Also, in one embodiment, tracking circumstances include transactions occurring between real-world objects and noting and storing the tracked transactions between the associated instantiated virtual objects. In one embodiment, the system further comprises a process of mining data regarding the position and movement of instantiated virtual objects, processing the data in various ways, and presenting the processed data to registered users. And in one embodiment, the system further comprises a process of mining data regarding transactions between instantiated virtual objects, processing the data in various ways, and presenting the data to registered users.

In another aspect of the invention a method is provided comprising executing software by a processor from a non-transitory physical medium at an Internet-connected server having a coupled SIO database 1110, presenting one or more interactive interfaces by the server on a display screen of network-connected computerized appliances, storing data describing virtual objects by a database in the SIO database 1110 in a structured manner enabled by the software, registering persons using individual ones of the Internet-connected computerized appliances as members of the system with login and identifying information, instantiating virtual objects in the database by registered members from the network-connected computerized appliances, instantiation involving a user proposing through an interactive interface a new virtual object for instantiation by entering at least a name and a description for the new object, determining by the system by comparison with stored information about virtual objects in the database if the proposed object is in fact new to the system, if the proposed object is in fact new, associating a unique instantiation code with the new object, instantiating the new object in the SIO database 1110 including the name and description, searching by information criteria for virtual objects in the database from the network-connected computerized appliances, accessing information about virtual objects returned in the search process, and edit the information about the virtual objects under particular circumstances, associating every virtual object instantiated uniquely with the registered user who first instantiated that object, and assigning privileges in controlling information about objects to the instantiating registered user.

In one embodiment of the method, information about virtual objects stored in the SIO database 1110 comprises object description by one or more of audio files, text files, photographs, and videos, object history including owners, and stories about the instantiated objects. Also, structured associations are made and recorded between objects and other objects in one embodiment and between objects and registered users. Also, in one embodiment, emotions are associated with objects. Also, in one embodiment, an object instantiated and associated with a unique code is composed of other virtual objects associated with unique instantiation codes and unique descriptions. Embodiments may include an SIO template database 1112 that stores input templates related to various SIO types. Input templates may contain a number of object characteristics that describe cohorts of similar objects. The SIO input module 1108 may use the object characteristics to identify the appropriate input template for constructing a given SIO. An example input template may be for a movie prop. This input template may include fields the movie the prop was used in, a clip of the scene in the movie in which the prop appears, the actor(s) who handled the prop, the maker of the prop, the prop maker, and the history of the prop since the movie's completion, such as who owns it, how they acquired it, and where it has been kept. Embodiments may include an SIO user database 1114 that stores information related to users of the Socrates network 102, such as their associated user device 118, login credentials, and SIOs they are associated with. Embodiments may include a cloud 116 that may be a wired and/or a wireless network. The cloud 116, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The cloud 116 may allow ubiquitous access to shared pools of configurable system resources and higher-level services that can be rapidly provisioned with minimal management effort, often over the Internet, and rely on sharing resources to achieve coherence and economies of scale in a public utility. In contrast, third-party clouds enable organizations to focus on their core businesses instead of expending resources on computer infrastructure and maintenance. Embodiments may include a user device 118 such as a computing device, laptop, smartphone, tablet, computer, smart speaker, or I/O devices. I/O devices may be present in the computing device. Input devices may include but are not limited to keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide-semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include but are not limited to video displays, graphical displays, speakers, headphones, inkjet printers, laser printers, or 3D printers. Devices may include but are not limited to a combination of multiple input or output devices such as Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs, including, but not limited to, Microsoft KINECT, SIRI for iPhone by Apple, Google Now, or Google Voice Search. Additional user devices have both input and output capabilities, including, but not limited to, haptic feedback devices, touchscreen displays, or multi-touch displays. Touchscreen, multi-touch displays, touchpads, touch mice, or other touch sensing devices may use different technologies to sense touch, including but not limited to capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. Embodiments may include some number 1-*n* of objects 120 with SIOs associated with them.

Figure 12:
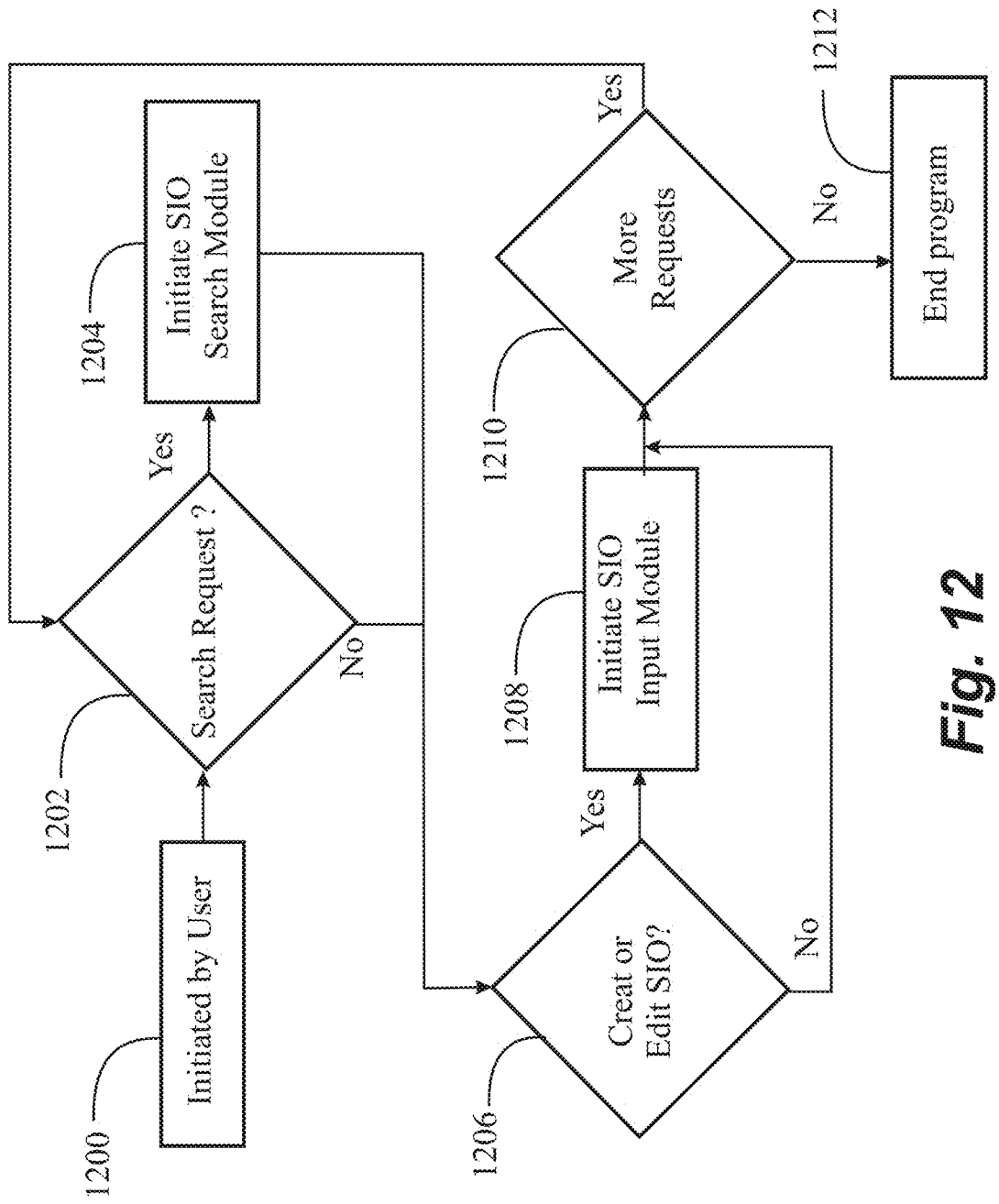
FIG. 12 illustrates a SIO Base Module in an embodiment of the system.

FIG. 12 illustrates the SIO Base Module 1104. The process begins with a user initiating the system at step 1200. It may then be determined if the user wants to search existing SIOs at step 1202. If the user elects to search existing SIOs, the SIO search module 1106 may be prompted at step 1204. It may then be determined if the user wants to create a new or edit an existing SIO at step 1206. If the user elects to create or edit SIOs, the SIO input module 1108 may be prompted at step 1208. It may then be determined if the user has additional requests to search, create, or edit an SIO at step 1210. If there are no more user requests, the program ends at step 1212.

Figure 13:
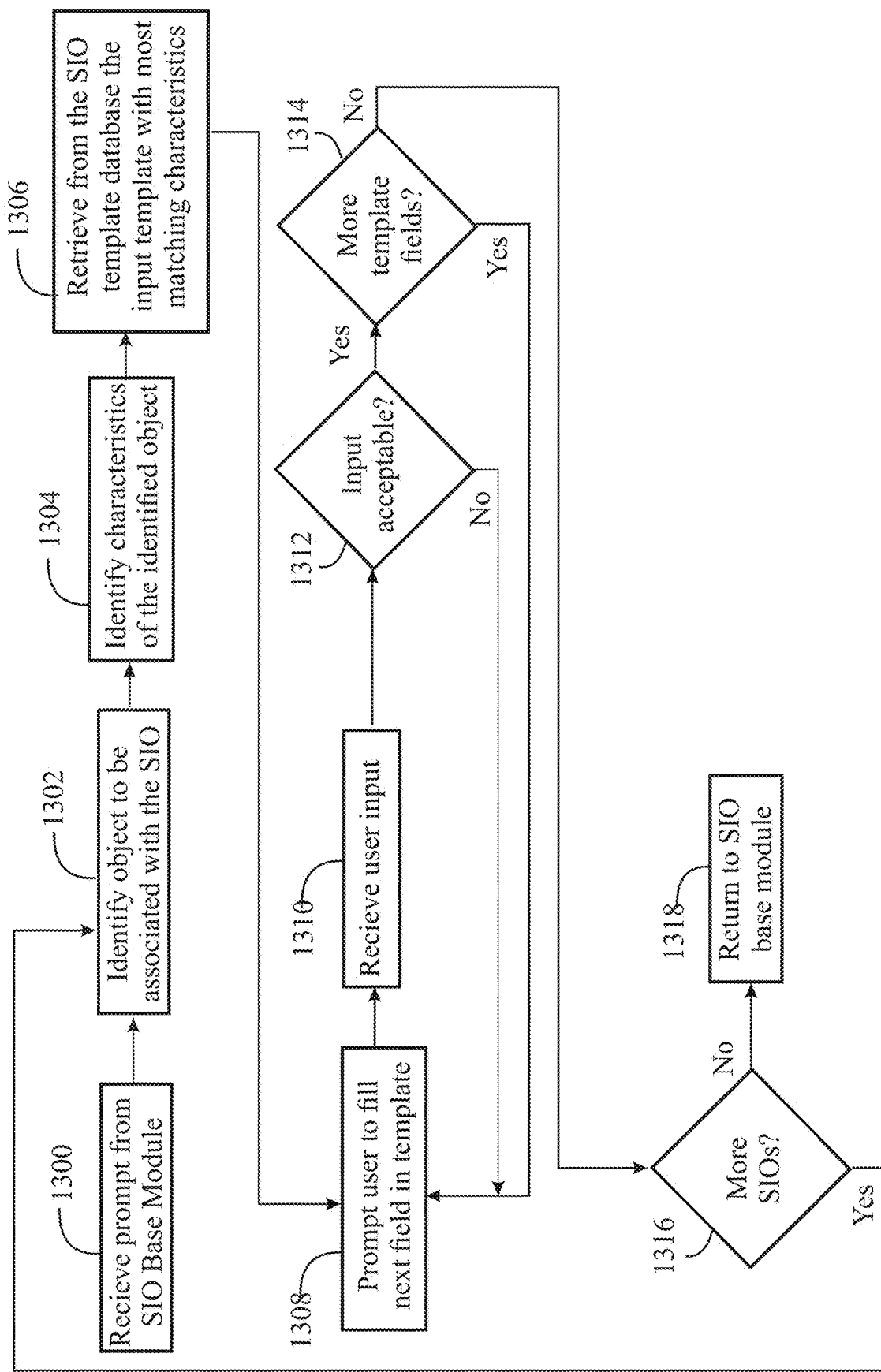
FIG. 13 illustrates a SIO Input module in an embodiment of the system.

FIG. 13 illustrates the SIO Input module 1108. The process begins with receiving a prompt from the SIO base module 1106 at step 1300. The object that is to be associated with an SIO may be identified at step 1302. The object may be identified in numerous ways. In one embodiment, the user may provide a written or verbal description of the object or an image of the object. From the information provided by the user, the characteristics of the object may be identified at step 1304. For example, an image may be provided by the user. Optical character recognition may be used to identify a vehicle identification number, make, or model name as a way to identify the object in the image as a car. Alternatively, keywords could be searched for in a written description or a verbal description that has been put through voice-to-text software to identify the object. For example, the object may be a movie prop, and the description provided may include the term "prop" and a movie title such as "The Good, the Bad and the Ugly." Once object characteristics have been identified, the input template associated with those object characteristics is retrieved from the SIO template database 1112 at step 1306. The user may then be prompted to fill fields in the input template at step 1308. The user may be prompted in numerous ways. Some fields may include a drop-down menu, such as selecting the make and model of a car. Some fields may have free fill fields that allow the user to provide a text or voice response to a question, such as "where was the car purchased?" The information requested by the prompt can include anything from personal narratives, stories, conversations, art literature, visual images, and multi-media, among others. A prompt for a food item may be designed to collect sensory information such as "how did it smell?" A prompt for an animal may be designed to collect biological information, such as "how old is the animal?" A prompt for an organization may be designed to collect conceptual information, such as "what is the group's mission?" A prompt for a piece of art may be designed to collect imagination information, such as "what story was the artist trying to tell with this piece?" A prompt for a location may be designed to collect knowledge information, such as "what is the demographic breakdown of the local population?" A prompt may also be designed to collect extended knowledge, such as "what about the location's history led to the demographic breakdown?" Prompts for fields in the input template may be presented to collect chronological information to construct a timeline of the object's history. A prompt may also be designed to collect knowable unknowns, such as "what studies need to be conducted?" A prompt may be designed to collect intelligence information, such as "what did (answer to the previous field) teach you about the object 1120?" A prompt may be designed to collect situational information, such as who, what, when, where, and why. A prompt may be designed to collect dispersed knowledge, such as "who else witnessed the event?" Some fields in the input template may have specific sources needed due to asymmetrical information. The qualifications of the user inputting information may determine which fields in the input template are presented to them. For example, if the object 1120 is a corporation, only users who are executives with the corporation or users in the financial industry may be presented with prompts related to information in the corporate earnings report. User identification or data source type may be incorporated with prompts for specific fields in the input template to determine data credibility. Prompts may be designed to collect machine-readable data specifically for systematic analysis, machine learning, and Artificial Intelligence. Prompts for data fields may include steps to verify the data integrity, such as ensuring the accuracy of the data, mapping database fields from a source database to the input template, identifying data governance and control, identifying data integrity enforcement steps, identifying data traceability, quality assurance, and control steps. The user input may be received at step 1310. The user input may be received in numerous ways. The user may submit an image or video clip. Relevant information may be pulled from the image or clip with image recognition or optical character recognition. For example, the user may submit a car's window sticker, and optical character recognition could identify the year/make/model. It may then be determined if the input is acceptable for the current field in the input template at step 1312. The acceptability of the input provided may be determined in numerous ways. The type of input may be the determining factor. For example, a field in the template for a movie prop may require a clip from the movie in which the prop appeared. If the input is in text, that would be an unacceptable input. If the user has provided an unacceptable input, they may be allowed to provide an acceptable input. The user may be allowed to skip certain input fields in the template, for example, if they do not have the requested information. It may then be determined if more fields are in the selected input template at step 1314. If there are more fields in the input template, the process returns to step 1308. If there are no more fields to be filled in the input template, it may be determined if the user wants to create or edit another SIO at step 1316. If there are more SIOs to be created or edited, the process returns to step 1302. If there are no more SIOs to be created or edited, the process returns to the SIO base module 1104 at step 1318.

Figure 14:
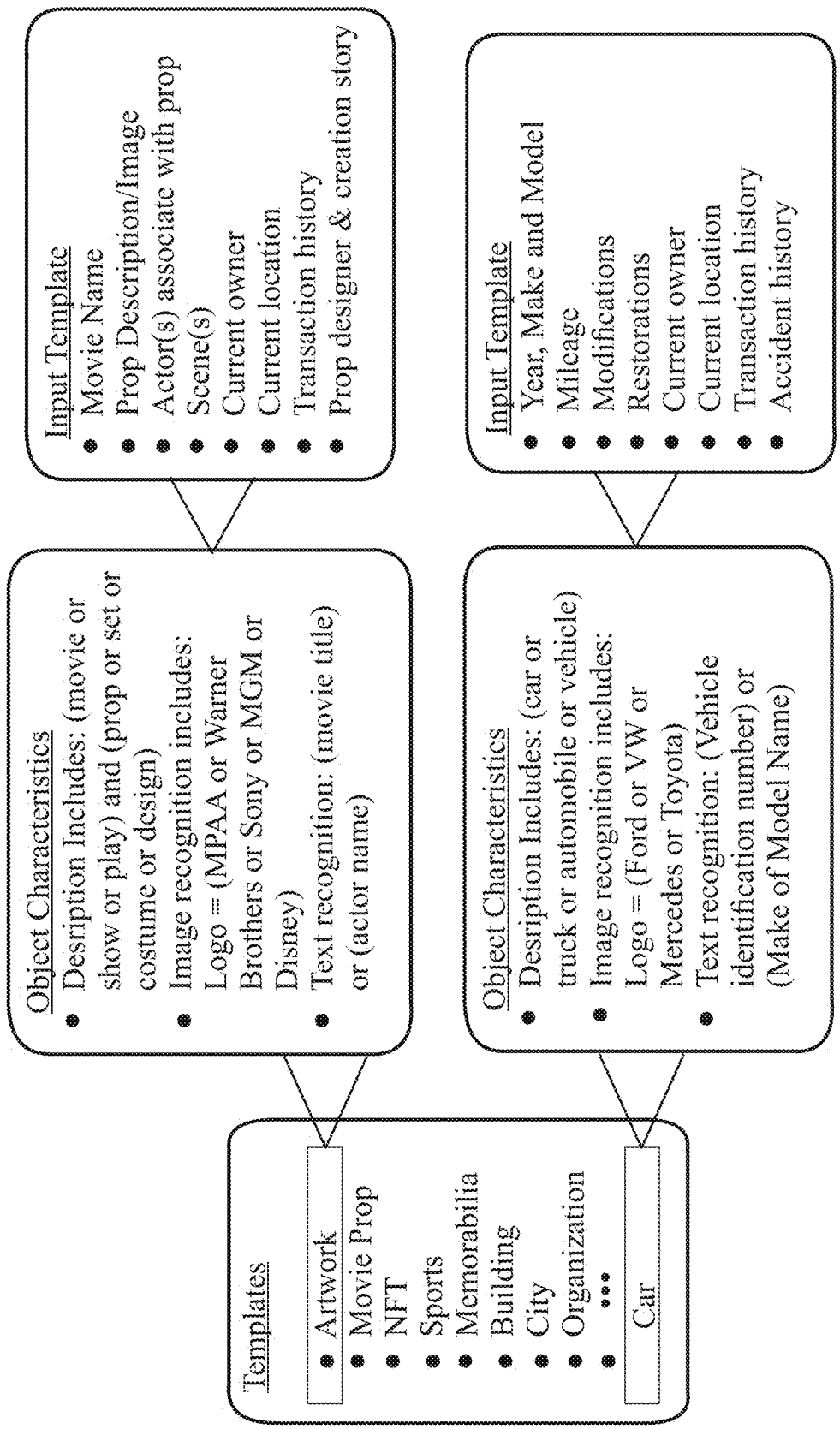
FIG. 14 illustrates a SIO Template Database in an embodiment of the system.

FIG. 14 illustrates the SIO Template Database 1112. The SIO Template Database 1112 contains the input templates for different types of objects to be associated with an SIO. Each input template has some number of object characteristics that may be used to match an input template with the type of object. For example, the SIO input module may receive an initial image from the user. Optical character recognition may identify a vehicle identification number in the image and then infer that the image contains a car or car part and retrieve the car template. The template provides the SIO input module 108 with the fields that the user needs to fill out. For example, if the system identifies the object associated with an SIO is a car, the template directs the SIO input module 108 to collect the current location, purchase history, accident history, modifications, and so on.

Figure 15:
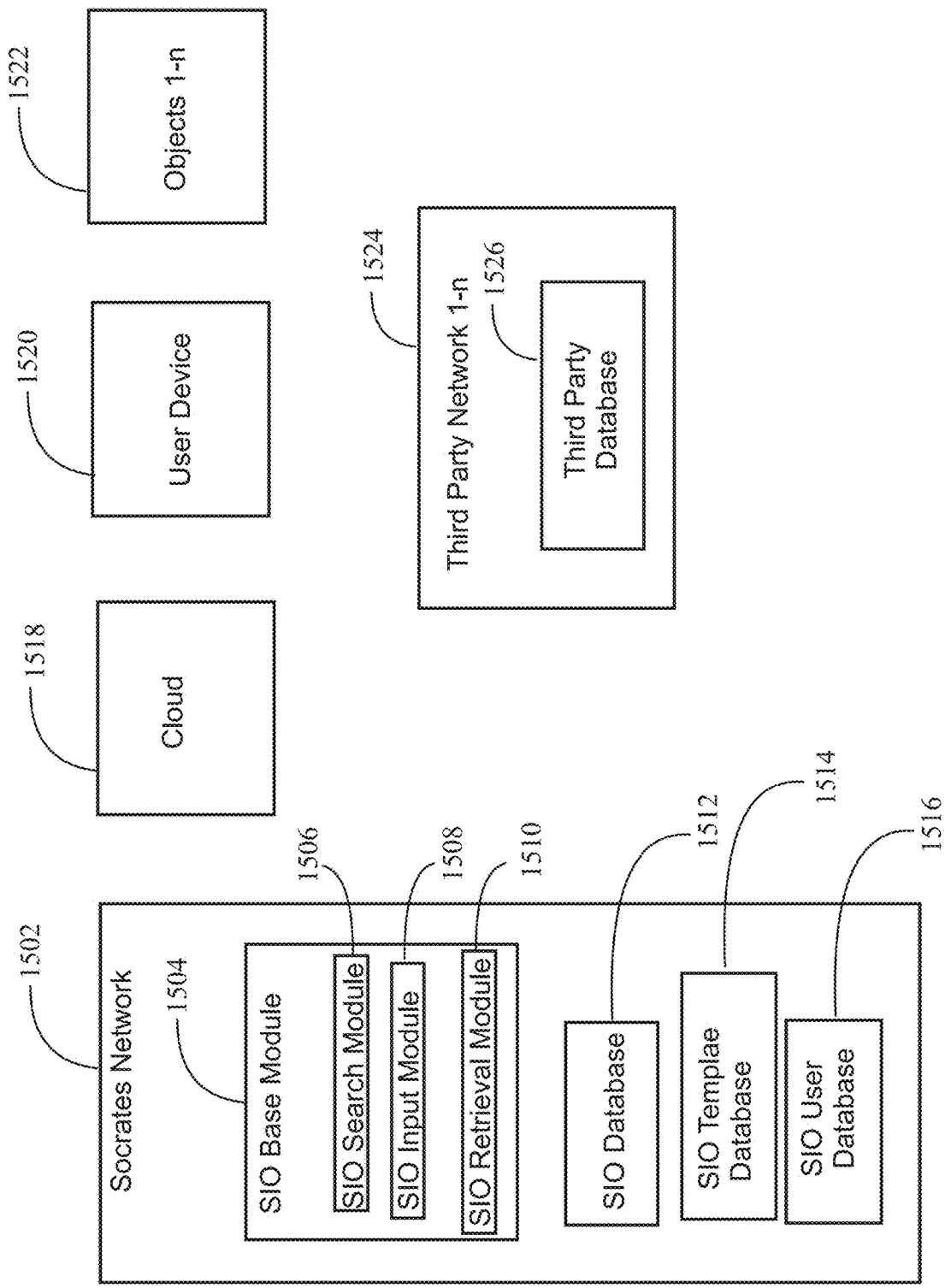
FIG. 15 illustrates a SIO system for automatic collection of SIO information.

In yet another aspect of the invention a system is provided for automated collection of SIO information. FIG. 15 illustrates the collection system. Which in this example comprises a Socrates network 1502 that may collect and store the social identity of objects (SIOs). The Socrates network 1502 enables instantiation of SIO data for each object in the system and recommends data based on time, place, space, written tags, photos, videos, descriptions, commonality, frequencies, and emotions to be displayed through an interface among other functions. In one embodiment of the invention, the Socrates network 1502 comprises an Internet-connected server with an SIO database 1512. The Socrates network 1502 executes an SIO base module 1504 by a processor from a non-transitory physical medium, one or more interactive interfaces presentable by the Socrates network 1502 on a user device 1520. An SIO database 1512 enabled by the SIO base module 1504 storing data describing real or virtual objects in the SIO database 1512 in a structured manner. A registration process enabled by the SIO base module 1504 whereby users using individual ones of the user devices are registered as members of the Socrates network 1502 with login and identifying information, an instantiation process provided by the SIO input module 1508 enabling instantiation of virtual objects in the SIO database 1512 by registered members from the user devices, wherein a user is enabled through one of the interactive interfaces to propose a new object for instantiation by entering at least a name and a description for the new object, the system determines by comparison with stored information about virtual objects in the SIO database 1512 if the proposed object is in fact new to the system, and if so associates a unique instantiation code with the new object, instantiating the new object in the SIO database 1512, and a search process provided by the SIO search module 1506 enabling registered members to search for SIOs associated with objects in the SIO database 1512 from the user devices, to access information about the objects when returned in the search process, and to edit the information about the objects under particular circumstances. Every object instantiated is associated uniquely with the registered user who first instantiated that object, and privileges in controlling information about that object are reserved for the instantiating registered user. Embodiments may include an SIO base module 104 that may allow users to input and search for SIOs. Embodiments may include an SIO search module 1506 that may allow users to search through the library of SIOs in the SIO database 1512. Embodiments may include an SIO input module 1508 that identifies a correct input template to retrieve from the SIO template database 1514. The input template may then be used to collect information associated with the SIO to be collected. Information associated with the object may comprise an object description by one or more of audio files, text files, photographs, and videos, object history including owners, and stories about the instantiated objects. Also, in one embodiment, structured associations are made and recorded between objects and other objects and between objects and registered users. Also, in one embodiment, emotions are associated with objects. Also, in one embodiment, an object instantiated and associated with a unique code is composed of other virtual objects associated with unique instantiation codes and unique descriptions. The input template is specific to the type of object for which the SIO is input. For example, if the object is a car, the input template may include fields such as the vehicle identification number, the make, model, accident history, etc. Embodiments may include an SIO retrieval module 1510 that identifies the information needed to complete the input template. The third-party network 1524 that is most likely to have the needed information is identified and queried. The query results are compared to the needed information and applied to the SIO when the query results match the needed information. Embodiments may include an SIO database 1512 that stores information associated with objects' SIOs. In one embodiment of the invention, information about virtual objects stored in the SIO database 1512 comprises object description by one or more of audio files, text files, photographs, and videos, object history including owners, and stories about the instantiated objects. Also, structured associations are made and recorded between objects and other objects in one embodiment and between objects and registered users. Also, in one embodiment, emotions are associated with objects. Also, in one embodiment, an object instantiated and associated with a unique code is composed of other virtual objects associated with unique instantiation codes and unique descriptions.

In one embodiment, the system further comprises a process enabled by the SIO base module 1504 by which the system associates instantiated virtual objects in the SIO database 1512 with objects in the real world having the same or similar description, periodically tracks information and circumstances regarding the real-world objects, and updates information regarding the instantiated virtual objects in the SIO database 1512 with the information and circumstances in tracking the associated real-world objects. Also, in one embodiment, tracking circumstances include noting real-world objects' geographic position and movement and storing that information associated with the instantiated virtual objects. Also, in one embodiment, tracking circumstances include transactions occurring between real-world objects and noting and storing the tracked transactions between the associated instantiated virtual objects. In one embodiment, the system further comprises a process of mining data regarding the position and movement of instantiated virtual objects, processing the data in various ways, and presenting the processed data to registered users. And in one embodiment, the system further comprises a process of mining data regarding transactions between instantiated virtual objects, processing the data in various ways, and presenting the data to registered users.

In another aspect of the invention a method is provided comprising executing software by a processor from a non-transitory physical medium at an Internet-connected server having a coupled SIO database 1512, presenting one or more interactive interfaces by the server on a display screen of network-connected computerized appliances, storing data describing virtual objects by a database in the SIO database 1512 in a structured manner enabled by the software, registering persons using individual ones of the Internet-connected computerized appliances as members of the system with login and identifying information, instantiating virtual objects in the database by registered members from the network-connected computerized appliances, instantiation involving a user proposing through an interactive interface a new virtual object for instantiation by entering at least a name and a description for the new object, determining by the system by comparison with stored information about virtual objects in the database if the proposed object is in fact new to the system, if the proposed object is in fact new, associating a unique instantiation code with the new object, instantiating the new object in the SIO database 1512 including the name and description, searching by information criteria for virtual objects in the database from the network-connected computerized appliances, accessing information about virtual objects returned in the search process, and edit the information about the virtual objects under particular circumstances, associating every virtual object instantiated uniquely with the registered user who first instantiated that object, and assigning privileges in controlling information about objects to the instantiating registered user.

In one embodiment of the method, information about virtual objects stored in the SIO database 1512 comprises object description by one or more of audio files, text files, photographs, and videos, object history including owners, and stories about the instantiated objects. Also, structured associations are made and recorded between objects and other objects in one embodiment and between objects and registered users. Also, in one embodiment, emotions are associated with objects. Also, in one embodiment, an object instantiated and associated with a unique code is composed of other virtual objects associated with unique instantiation codes and unique descriptions. Embodiments may include an SIO template database 1514 that stores input templates related to various SIO types. Input templates may contain a number of object characteristics that describe cohorts of similar objects. The SIO input module 1508 may use the object characteristics to identify the appropriate input template for constructing a given SIO. An example input template may be for a movie prop. This input template may include fields the movie the prop was used in, a clip of the scene in the movie in which the prop appears, the actor(s) who handled the prop, the maker of the prop, the prop maker, and the history of the prop since the movie's completion, such as who owns it, how they acquired it, and where it has been kept. Embodiments may include an SIO user database 1516 that stores information related to users of the Socrates network 102, such as their associated User device 1520, login credentials, and SIOs they are associated with. Embodiments may include a cloud 1518 that may be a wired and/or a wireless network. The cloud 1518, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The cloud 1518 may allow ubiquitous access to shared pools of configurable system resources and higher-level services that can be rapidly provisioned with minimal management effort, often over the Internet, and relies on sharing resources to achieve coherence and economics of scale in a public utility. In contrast, third-party clouds enable organizations to focus on their core businesses instead of expending resources on computer infrastructure and maintenance. Embodiments may include a user device 1520, such as a computing device, laptop, smartphone, tablet, computer, smart speaker, or I/O devices. I/O devices may be present in the computing device. Input devices may include but are not limited to keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide-semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include but are not limited to video displays, graphical displays, speakers, headphones, inkjet printers, laser printers, or 3D printers. Devices may include but are not limited to a combination of multiple input or output devices such as Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs, including, but not limited to, Microsoft KINECT, SIRI for iPhone by Apple, Google Now, or Google Voice Search. Additional user devices have both input and output capabilities, including, but not limited to, haptic feedback devices, touchscreen displays, or multi-touch displays. Touchscreen, multi-touch displays, touchpads, touch mice, or other touch sensing devices may use different technologies to sense touch, including but not limited to capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. Embodiments may include some number 1-*n* of objects 1522 that have SIOs associated with them. Embodiments may include some number 1-*n* of third-party networks 1524 that may have information appropriate for one or more fields in an input template. Examples of third-party networks 1524 include but are not limited to manufacturers or sellers of the objects 1520 to provide product details, specifications, and transaction history. Third parties may also include social networks that may have personal stories and details about an object 1522. Regulators, such as the state department of motor vehicles, may also be third parties from which data relevant to an object 1522 may be obtained. Embodiments may include third-party databases 1526 that are the memory on the third-party network 1524 where the relevant information is stored.

Figure 16:
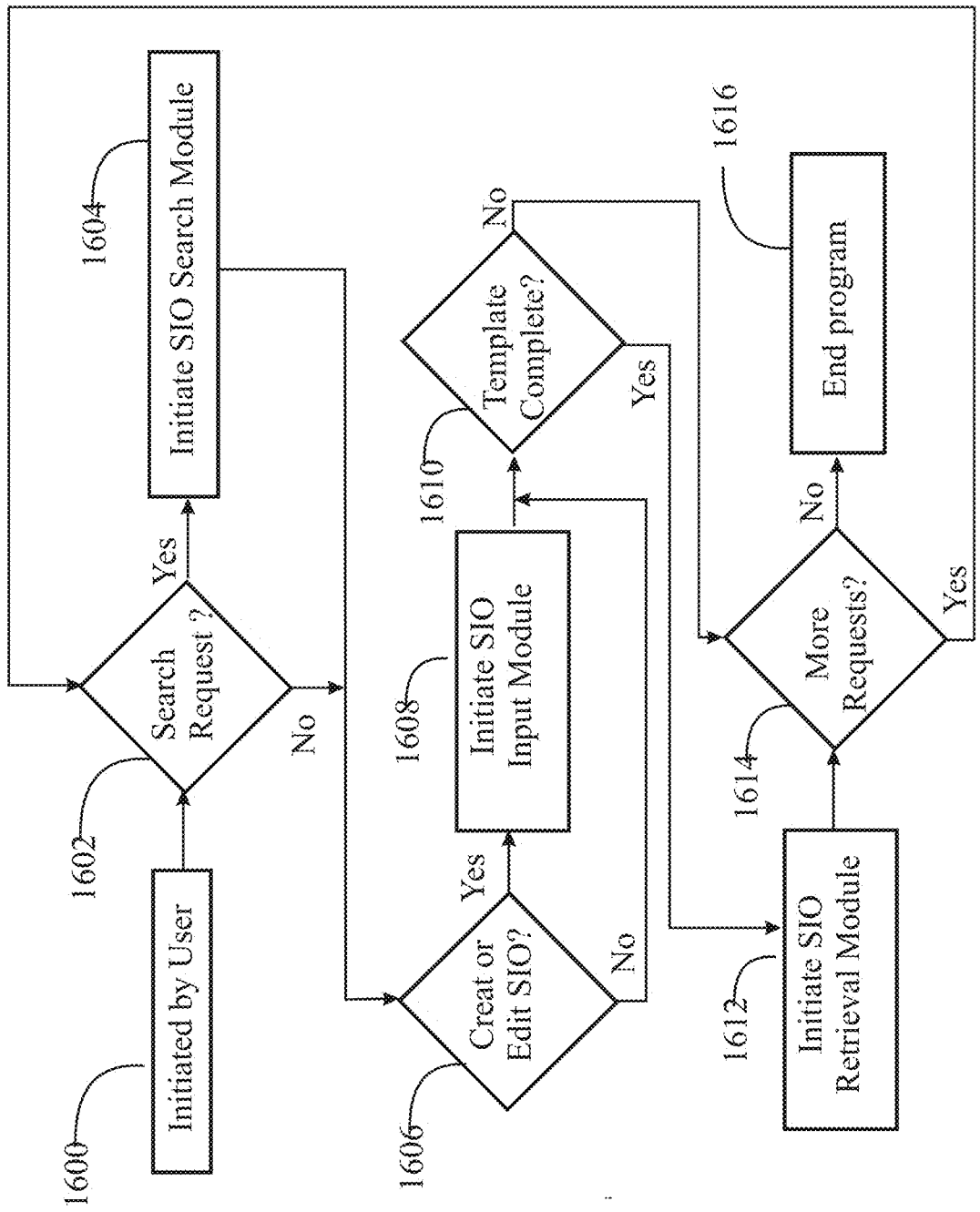
FIG. 16 illustrates a SIO Base Module in the system of FIG. 15.

FIG. 16 illustrates a process of the SIO base module 1504. The process begins with a user initiating the system at step 1600. It may then be determined if the user wants to search existing SIOs at step 1602. If the user elects to search existing SIOs, the SIO search module 1508 may be prompted at step 1604. It may then be determined if the user wants to create a new or edit an existing SIO at step 1606.

If the user elects to create or edit an SIO, the SIO input module 1608 may be prompted at step 1608. It may then be determined if the input template has been completed at step 1610. If the input template has not been completed, the SIO retrieval module 1510 may be prompted at step 1612. It may then be determined if the user has additional requests to search, create, or edit an SIO at step 1614. If there are no more user requests, the program ends at step 1616.

Figure 17:
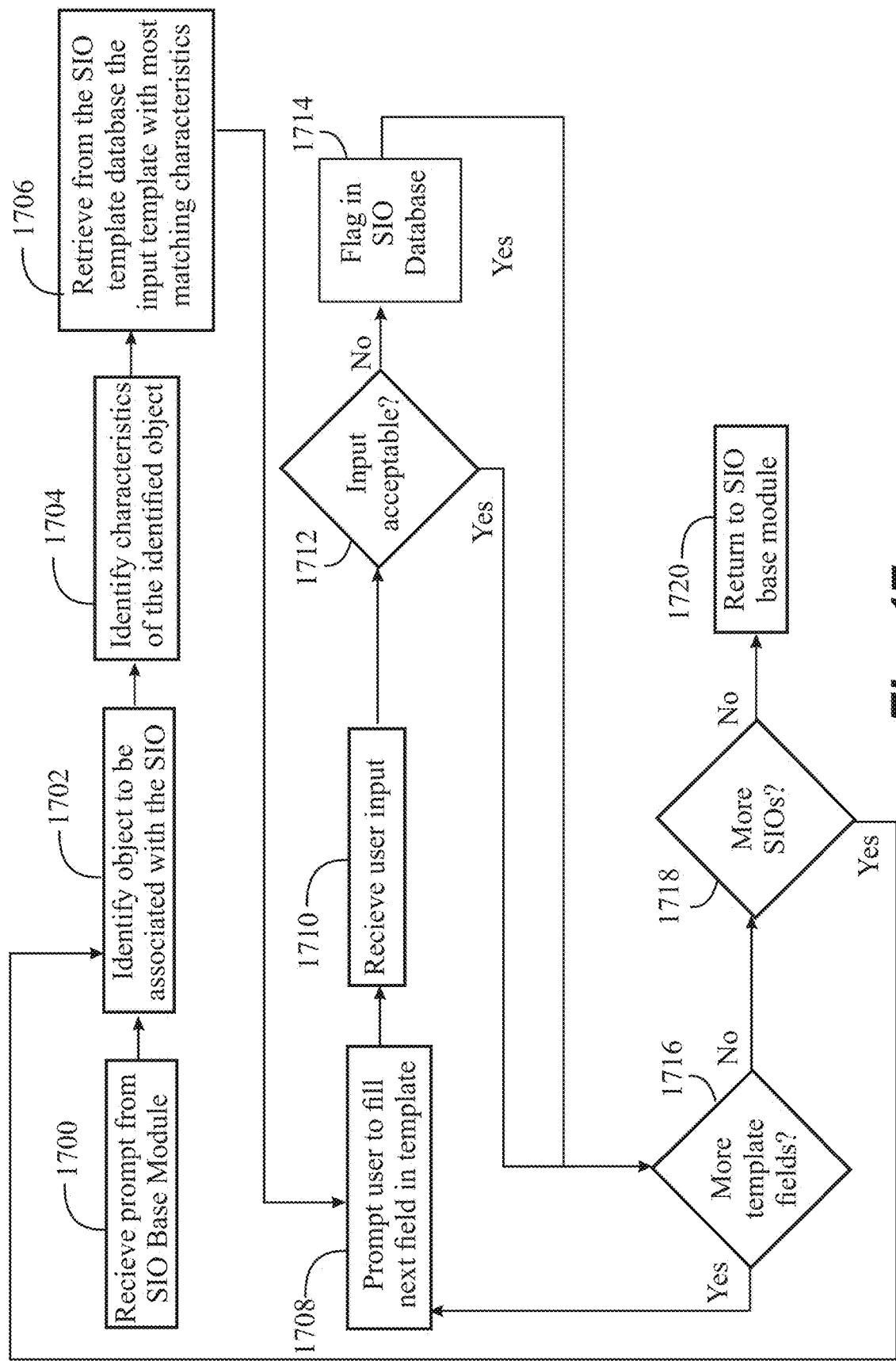
FIG. 17 illustrates a process for instantiating and editing objects in a SIO database.

FIG. 17 illustrates the SIO Input module 1508. The process begins with receiving a prompt from the SIO base module 1504 at step 1700. The object that is to be associated with an SIO may be identified at step 1702. The object may be identified in numerous ways. In one embodiment, the user may provide a written or verbal description of the object or an image of the object. From the information provided by the user, the characteristics of the object may be identified at step 1704. For example, an image may be provided by the user. Optical character recognition may be used to identify a vehicle identification number, make, or model name as a way to identify the object in the image as a car. Alternatively, keywords could be searched for in a written description or a verbal description that has been put through voice-to-text software to identify the object. For example, the object may be a movie prop, and the description provided may include the term "prop" and a movie title such as "The Good, the Bad and the Ugly." Once object characteristics have been identified, the input template associated with those object characteristics is retrieved from the SIO template database 1514 at step 1706. The user may then be prompted to fill fields in the input template at step 1708. The user may be prompted in numerous ways. Some fields may include a drop-down menu, such as selecting the make and model of a car. Some fields may have free fill fields that allow the user to provide a text or voice response to a question, such as "where was the car purchased?" The information requested by the prompt can include anything from personal narratives, stories, conversations, art literature, visual images, and multi-media, among others. A prompt for a food item may be designed to collect sensory information such as "how did it smell?" A prompt for an animal may be designed to collect biological information, such as "how old is the animal?" A prompt for an organization may be designed to collect conceptual information, such as "what is the group's mission?" A prompt for a piece of art may be designed to collect imagination information, such as "what story was the artist trying to tell with this piece?" A prompt for a location may be designed to collect knowledge information, such as "what is the demographic breakdown of the local population?" A prompt may also be designed to collect extended knowledge, such as "what about the location's history led to the demographic breakdown?" Prompts for fields in the input template may be presented so as to collect chronological information to construct a timeline of object 122's history. A prompt may also be designed to collect knowable unknowns, such as "what studies need to be conducted?" A prompt may be designed to collect intelligence information, such as "what did (answer to the previous field) teach you about the object 122?" A prompt may be designed to collect situational information, such as who, what, when, where, and why. A prompt may be designed to collect dispersed knowledge, such as "who else witnessed the event?" Some fields in the input template may have specific sources needed due to asymmetrical information. The qualifications of the user inputting information may determine which fields in the input template are presented to them. For example, if the object 122 is a corporation, only users who are executives with the corporation or users in the financial industry may be presented with prompts related to information in the corporate earnings report. User identity or data source type may be incorporated with prompts for specific fields in the input template to determine data credibility. Prompts may be designed to collect machine-readable data specifically for systematic analysis, machine learning, and Artificial Intelligence. Prompts for data fields may include steps to verify the data integrity, such as ensuring the accuracy of the data, mapping database fields from a source database to the input template, identifying data governance and control, identifying data integrity enforcement steps, identifying data traceability, quality assurance, and control steps. The user input may be received at step 1710. The user input may be received in numerous ways. The user may submit an image or video clip. Relevant information may be pulled from the image or clip with image recognition or optical character recognition. For example, the user may submit a car's window sticker, and optical character recognition could identify the year/make/model. It may then be determined if the input is acceptable for the current field in the input template at step 1712. The acceptability of the input provided may be determined in numerous ways. The type of input may be the determining factor. For example, a field in the template for a movie prop may require a clip from the movie in which the prop appeared. If the input is in text, that would be an unacceptable input. If the user has provided an unacceptable input, they may be allowed to provide an acceptable input. The user may be allowed to skip certain input fields in the template, for example, if they do not have the requested information. If the input is unacceptable, or the user did not provide one, the field is flagged in the SIO database 1512 at step 1714. It may then be determined if more fields are in the selected input template at step 1716. If there are more fields in the input template, the process returns to step 1708. If there are no more fields to be filled in the input template, it may be determined if the user wants to create or edit another SIO at step 1718. If there are more SIOs to be created or edited, the process returns to step 1702. If there are no more SIOs to be created or edited, the process returns to the SIO base module 1504 at step 1720.

Figure 18:
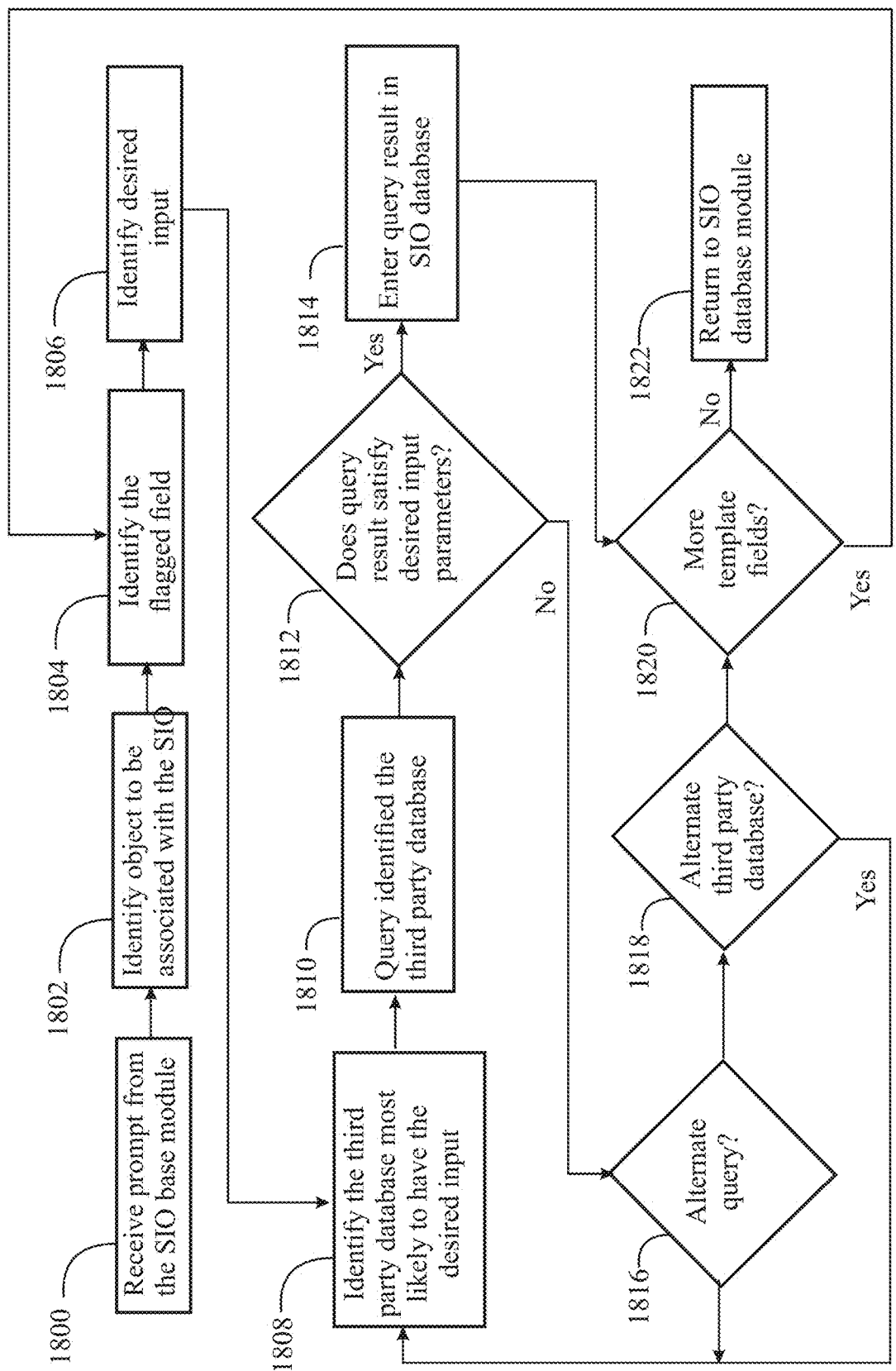
FIG. 18 illustrates a process for identifying desired input and retrieving same from third-party databases.

FIG. 18 illustrates the SIO retrieval module 1510. The process begins with receiving a prompt from the SIO base module 1504 at step 1800. The object that is to be associated with an SIO may be identified at step 1802. The input template field(s) are flagged by the SIO input module 1508 at step 1804. Fields may be flagged for having no information as well as for incorrect or incomplete information. The desired input for the flagged field is identified from the SIO template database 1514 at step 1806. The third-party database 1526 that is most likely to have the desired information is identified at step 1808. The third-party database 1526 that is most likely to have the desired information may be identified in numerous ways. For example, the original manufacturer's website may be the ideal source for object specifications, the history of similar objects made by the manufacturer, and the history of the object's development. Retailers may also be a source of the desired information. For example, auction houses often have detailed object histories that may include details about the specific object and its history. In one embodiment, a search engine such as Google, Bing, or DuckDuckGo, may be used to identify a third-party database 126 likely to have the desired information. Social media may also be queried for images and stories associated with the object and its owner(s). For example, object recognition could be used to compare a provided image of an object to images on a social media site. For example, the object 122 may be a ticket stub to a baseball game. If the desired information is the game score, the third-party database 1526 searched may be on baseball-reference.com, or mlb.com. If the desired information is the game attendees, social networks such as Facebook could be searched for posts that mention the identified game.

The identified third-party database 1526 may then be queried at step 1810. It may then be determined if the query results satisfy the desired input parameters in the input template at step 1812. The acceptability of the query results may be determined in numerous ways. The type of information may be the determining factor. For example, a field in the template for a movie prop may require a clip from the movie in which the prop appeared. If the input is in text, that would be an unacceptable input. If the query result is unacceptable, the process skips to step 1816. If the query result is acceptable, the query result is written to the SIO database 1512 at step 1814. If the search query did not return the desired results, it may be determined if there is an alternate query at step 1816.

If there is an alternate query, the process returns to step 1810. If object 122 is a car, the original query to the manufacturer's database may be the car's year, make, and model. An alternative query may be done with the car's vehicle identification number. If there is no alternate query, it may be determined if there is an alternative third-party database 1526 to query at step 1818. If there is an alternate third-party database 1526 to query, the process returns to step 1810. For example, a car manufacturer's database may be queried for the car's original sale date and location. If that query does not return the desired results, the system may query the state department of motor vehicle databases for transactions related to the vehicle identification number.

Another example could be object 122 being a series of baseball cards. The original query could be to the card manufacturer Topps, and an alternate query could be to mlb.com. The initial query to Topps may be based on the card number, whereas the alternate query to mlb.com may be based on the player's name. It may then be determined if more template fields remain to be filled at step 1820. If more fields are to be filled, the process returns to step 1804. In one embodiment, queries may be run on fields that already have information in them to either add additional information or confirm the veracity of the existing information. When there are no more fields to run queries for, the process returns to the SIO base module 1504 at step 1822.

FIG. 14 illustrates the SIO Template database 1514. The SIO Template Database 1514 contains the input templates for different types of objects to be associated with an SIO. Each input template has some number of object characteristics that may be used to match an input template with the type of object. For example, the SIO input module may receive an initial image from the user. Optical character recognition may identify a vehicle identification number in the image and then infer that the image contains a car or car part and retrieve the car template. The template provides the SIO input module 1508 with the fields that the user needs to fill out. For example, if the system identifies the object to be associated with an SIO is a car, the template directs the SIO input module 1508 to collect the current location, purchase history, accident history, modifications, etc.

In another embodiment of the invention functionality is provided that enables a user to search the database in a manner not so far taught, and not known in the prior art as of the time of filing the instant application, and to display information resulting from such a search, also in a manner not so far taught.

In an embodiment of the invention taught above, a user is enabled to instantiate objects in the SIO database, which automatically checks as to whether the candidate object is a duplicate of an object already in the database, and if not, automatically generates a new and unique SIO code for the new object. The same SIO code is never assigned to any other object, virtual or real. However, the code itself does not convey any information about the object to which it is associated. FIG. 2 described above is a flow diagram describing a process of instantiating an object, and mentions an interactive interface provided to a user for guiding the process of instantiation. The interactive interface, however, is not illustrated or described.

For some contemplated purposes and functions the inventors believe that assigned codes may be tagged with discriminatory information. For example, at the point of instantiation, when a particular object is entered for instantiation by a registered user, in one embodiment a function is made available for the instantiating user to tag the object as (1) real (2) virtual (3) a person (4) a machine (5) a land vehicle (6) a boat (7) an assembly of smaller objects, (8) a musical instrument, (9) a weapon, and so on. The list of such tags will understandably be rather extensive and may vary in different embodiments.

In another embodiment of the invention every act by a registered user interacting with the database may be date and time stamped, and the nature of the action may be noted as well. Date and time stamping enables a different user searching the database to know exactly when an SIO object was instantiated in the system, and to know when media files were entered and associated with an SIO object, and when and by whom an SIO object may be associated with another SIO object. In one embodiment a date and time stamp is recorded for each instance of a particular action or process. For example, when a user instantiates an object, at least a description of the object is entered by the instantiating user. Subsequently the description may be updated or amended, and a date and time may be recorded for each time an update or an amendment is made. Date and time stamping may be applied for other actions by users, such as, for example, when a search is made of the database, and what search criteria are used. Such records of actions of various sorts may be very helpful in the processes of SIO 360.

Referring again to FIG. 3 it is seen that a user at a user station 301 may have access to either Input and Instantiation functions 303 as a part of software 302, or may have access to search and retrieval functions 304.

Figure 19A:
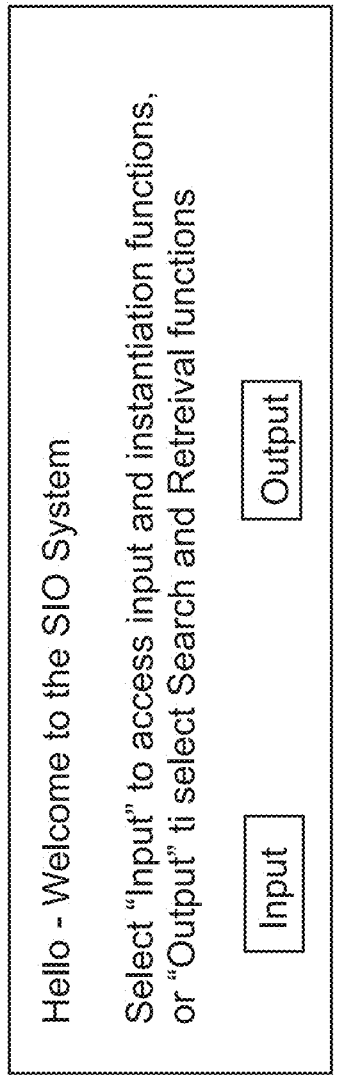
FIG. 19A is an exemplary interactive interface in an embodiment of the invention.

FIG. 19A illustrates an example interactive interface presented to a user on logging in to the SIO system. A user may select either Input and Instantiation functions or Search and Retrieval functions by selecting "Input" or "Output". The skilled person will understand that the nature of the home page and the background may vary widely, and the purpose here is to navigate among alternative functions in the system.

If the user selects "Input" (or equivalent) in the interactive interface represented by FIG. 19A the user will be directed to interactive interfaces providing functionality for instantiating new SIO objects, for adding (uploading) descriptions and information regarding existing SIO objects, and generally for all input functions. If the user selects "Output" in the interface of FIG. 19A, the user is directed to functions for performing searches and displaying results, that is, "output" functions.

Figure 19B:
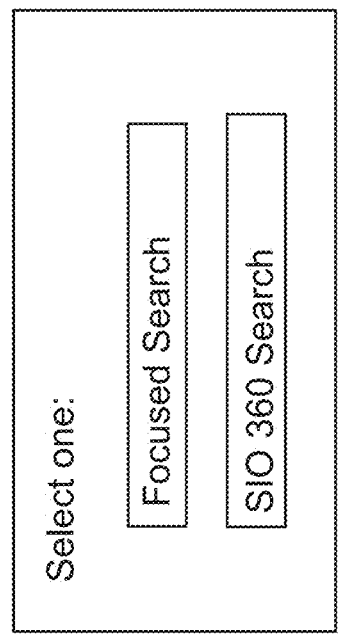
FIG. 19B is a further interactive interface in an embodiment of the invention.

FIG. 19B provides an option for a "specific" focused narrow search, or optionally for an "SIO 360" search. If the user selects "Focused Search" (or equivalent) the user is provided one or more input fields for finding specific information regarding a specific SIO. For example, the user may enter an SIO number in which case the user will be directed to description and media information associated with an SIO object bearing that SIO code. The user in this process will be accorded navigation tools to be able to access different media files associated with the specific SIO code and will be able to navigate elsewhere in the system if desired. The user may also enter other queries for a specific search, such as "all US Battleships", a specific baseball player by name, a specific artwork by name, and any one of a great variety of queries. The user may enter a query such as "first five objects instantiated on a specific day". Users may be quite creative with specific search queries.

With a specific search the system is adapted to return the best answer to the search query. In response to the query "first five objects instantiated on a specific day" the system will return a list of objects, with names and descriptions that were instantiated on the day in the query. The user may also extend the query to request a return of the identity of the registered user who instantiated the objects on that day and other information, for example the time of day that each object was instantiated. The query is always specific and the return is also specific. To change the search the user must enter a new search query and initiate another search.

In the instance of an SIO 360 search an entirely different experience is provided to the registered user. If the registered user selects "SIO 360" in the interactive interface of FIG. 19B, the system enters into a reactive dialogue with the user. The skilled person will understand that every registered user engaged with the system is engaging through a platform, termed a user station in FIG. 4, that has an Internet connection to the SIO system and software 302 providing Input and Instantiation functions 303 and search and retrieval functions 304 described above. The user station also has output capability such as a display screen and one or more speakers through which the SIO system may return audio and video in response to queries and commands from the user at the user station. The user station may in one circumstance be a smart telephone, and in another may be a high resolution, large screen smart TV with a sophisticated audio output sub system. The user station also will have a microphone input by which a user may vocalize to the SIO system.

For a purpose of this description assume that the user station has a high-resolution large screen, the audio output is a sophisticated, multiple speaker system, and the Internet connection is a high-bandwidth connection causing no latency effects. Referring again to FIG. 4 the skilled person will understand that the SIO system, referred to in FIG. 4 as "The Virtual World of Objects Mirroring the Real World of Objects" stores a very large number of SIO object codes assigned on instantiation by registered users, the object codes associated with object descriptions including text, photos and videos, object history, object stories, emotions and personal associations, such as identity of persons domiciled in such as residences having SIO code and dates of residence, and much, much more. The SIO data repository as a whole is as stated: "A Virtual World of Objects Mirroring the Real World of Objects"

Figure 20:
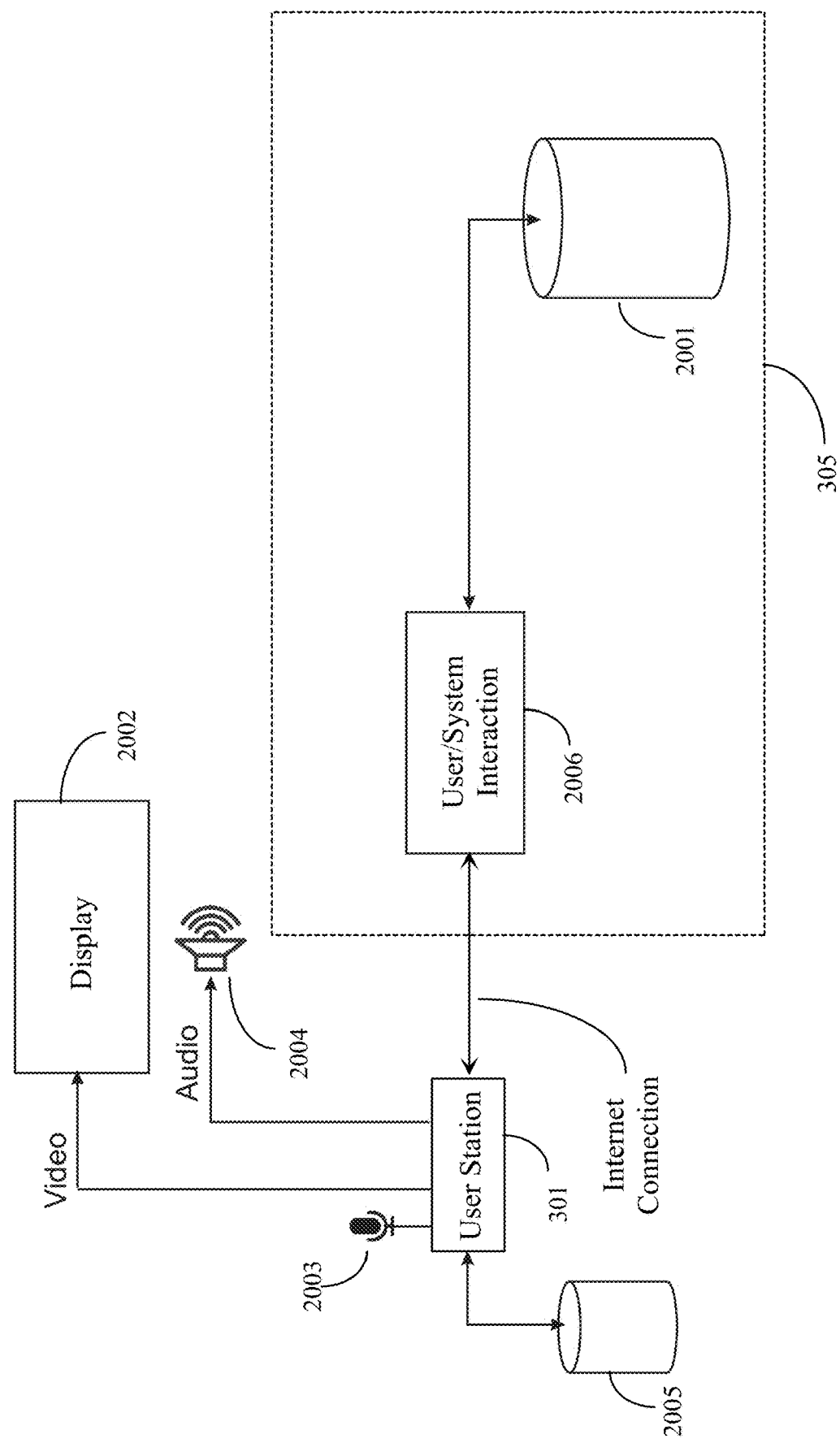
FIG. 20 is a diagram similar to FIG. 4 with additional functional elements included in an embodiment of the invention.

FIG. 20 is a diagram similar to FIG. 4 with additional functional elements included in an embodiment of the invention. SIO 360 operates essentially as a dialogue between a user and the SIO system. The dialogue is managed in a software enabled interface 2006 where utterances by the user through mic 2003 are delivered to the system and interpreted. The user speaks into mic 2003, which in one embodiment may be a sensitive microphone near the user's mouth, such that the user may in essence whisper voice queries and commands for the system to follow. Interface 2006 is a natural language system in which the user tells the system what to do or requests a return, and the system interprets the queries and commands and responds with a best of choice return.

When a user first selects SIO 360 in FIG. 19B the system expects the next utterance by the user to be an entry into the system. It stands to reason that for each user invoking an SIO 360 interaction there must be an entry point, a starting point. As a very simple example a user may invoke SIO 360 and whisper (or speak) Vincent Van Gogh. The system at interface 2006 takes the object Vicent Van Gogh as a starting point and returns the SIO code for VVG on display 2002 as well as the name and text description for the artist VVG that was entered by the instantiating user. The system may in one embodiment also recite the description by speaker system 2004.

In activities of SIO 360 each time a user enters the system the system sets up a session for that user for that entry, which session stays active until the user utters an ending word or phrase agreed upon in the system. To end an SIO session the activating user might simply say "done" or "end" and the session is ended. After a session is ended, to continue in SIO 360 a user must reselect SIO 360 in the interactive interface of FIG. 19B and provide as new entry point. Between the initiation of an SIO session and its end a wide variety of actions may take place. For example, after the user initiates with "Vincent Van Gogh" and the system returns preliminary info, such as the SIO code and the initial description, the user may direct the system to retrieve, for example, a rendition of the first known example of a painting by VVG, and display that copy of a painting on display 2002. The user might say, for example: "his first painting" and the system reacts.

It is a characteristic of an SIO 360 session that the system reacts to the user immediately in every instance. The user might say when the first painting is displayed: "his next painting" and the system will display VVGs second painting. As this is a dialogue, the user may at this point realize she wants to see both paintings at the same time with a notation of which is first and second, and may immediately say so, and the system will react by displaying both paintings with a 1 and 2 notation in the useful region of display 2002. The skilled person may see where this may go: the user may investigate the bulk of work by Vincent Van Gogh. The user may also manage the characteristics of display 2002 and audio system 2004 with commands like "brighter", "dimmer" "louder", "softer" and the like.

The same sort of search and consumption may be managed, for example, for music. A user may peruse by display and audio the operatic works of Verdi, or Johhny Cash or Dolly Parton. Or may review the games, or portions of same, of the San Fransisco Forty-Niners or the Pittsburgh Steelers.

During an SIO Search session a user may navigate the system in a variety of ways. The user at anytime may move to a new source of audio-video and consume return from the new source. The user may say, for example, at any point in a session: "Go to the Battleship Missouri" and the system will display a rendition of Mighty Mo and the instantiating description as well as the SIO code. A user may also elect to download and store individual audio and video provided by the system in response to the user's queries and commands. A local data repository 2005 is provided at each user station and the user may command: "keep a copy of that painting" or "record that song" or any other natural language command and the system will endeavor to comply. If the system cannot comply it will return "unable to comply." It is not necessary that a music work be played through speaker(s) 2004 for the same to be recorded or downloaded. The user may simply say download Johnny Cash "Ring of Fire", and the system will do so to data repository 2005.

It was described above that display 2002 is a large screen high resolution display, the bandwidth is high, and the audio is high quality, so the SIO 360 system in one respect may be a learning and entertainment system for a user. A user can also ask the system to list and access other artists or musicians in a genre and sample output from many such sources.

The SIO search system is thus a system for a user to navigate the content of the SIO system and to consume and record information from the system.

To afford a better understanding of the SIO 360 navigation and retrieval system two examples are provided below:

Example 1: Poetry

A user selects SIO 360 in the user interface of FIG. 19B.
The user utters "William Butler Yeats" to microphone 2003
The system displays a picture of WBY on display 2002 along with his description and code.
The user utters "The Wandering Aengus" to mic 2003.
The system displays the poem "The Song of the Wandering Aengus: on display screen 2002.
The user utters "recite". The system presents a recitation of "The Song of the Wandering Aengus" through speaker(s) 2004.
The user utters "recite again"
The system recites the poem again
The user utters "What was his first published poem?"
The system returns: William Butler Yeats' first published poem was titled "Song of the Fairies" and was released alongside a second poem titled "Voices" in the Dublin University Review. He published these two poems in 1885 when he was 20 years old.
The user utters: "recite "Song of the Faries".
The system recites "Song of the Faries.
The user utters "Save that". The system records "Song of the Faries" in repository 2005.
The user utters "Now go to Henry Wadsworth Longfellow" . . . .
The skilled person may see that this session may continue for a considerable time, until the user utters the ending word or phrase, and the user may enjoy a lot of poetry and gain a lot of knowledge in the process.

Example 2: Supply Chain

A user selects SIO 360 in the user interface of FIG. 19B.
The user utters Peet's Coffee, Dark Roast Ground Coffee-Organic French Roast 18 Ounce Bag, USDA Organic to microphone 2003.
The system displays "Not in my knowledge base". The user utters Peet's Coffee Major Dickason's Blend, Dark Roast.
The system returns a description of that coffee on display 2002.
The user utters "Known sources". The system returns a list of suppliers that provide coffee beans for this brand.
The user may continue queries for alternate suppliers, find names of individual growers and farmers, record stories associated with this particular coffee brand, and much more until deciding to end the session.

The skilled person may enlarge upon these examples in many ways.

The skilled person will understand, again, that the descriptions herein of various embodiments and implementations are entirely exemplary. The scope of the invention is limited only by the claims.

The invention claimed is:

1. A system comprising:
an Internet-connected server having a coupled internal data repository, the server executing software by a processor from a non-transitory physical medium;
an internal database enabled by the software, storing data describing virtual objects in a structured manner, each virtual object having a unique SIO code, and an associated body of digital media providing object description by one or more of audio files, text files, photographs, and videos, object history including owners and stories about the virtual objects;
a user station with Internet access, a microphone receiving user voice, a display screen, a speaker system, and a coupled local data repository; and
a software-enabled interface between the user station and the internal data repository;
wherein the system presents an input option to a user at the user station affording the user a selection of an SIO Search, the user selects SIO search, the system in response initiates a reactive natural language session with the user through the software-enabled interface, the user speaks a name or a code of a virtual object stored in the internal database, and the system in reponse displays a name, an SIO code and a description of the virtual object on the display screen.

2. The system of claim 1 wherein virtual objects described in the internal data repository mirror real objects in the real world and encompass at least physical objects, imaginary objects, poetry, musical works, works of art like paintings, complex objects comprising assemblies of smaller objects, buildings, arenas, sports teams, sport paraphernalia, and anything described by a noun.

3. The system of claim 1 wherein structured associations are recorded in the internal data repository between individual ones of virtual objects and between objects and persons.

4. The system of claim 3 wherein the user queries associations and the system in response reports the associations between virtual objects in one or both of the display and the speaker system.

5. The system of claim 2 wherein, in response to a user command the system recites a specific poem.

6. The system of claim 5 wherein the system has the specific poem recorded by a plurality of persons and affords the user a choice of reciters.

7. The system of claim 6 wherein in response to a user command the system delivers a specific musical presentation.

8. The system of claim 7 wherein the system has the musical presentation recorded by a plurality of musicians and musical groups, and affords the user a choice of musicians and groups to deliver the musical presentation.

9. The system of claim 2 wherein the display is a large screen, high resolution display, the speaker system is a high-end system and the Internet connection is high-bandwidth.

10. The system of claim 2 wherein, in response to user queries, the system responds with history, composition, beginning stories and other information about any virtual object.

\* \* \* \* \*